United States Patent
Son et al.

(10) Patent No.: US 11,477,844 B2
(45) Date of Patent: Oct. 18, 2022

(54) MULTI-USER(MU) TRANSMISSION FOR SOLICITING ACKNOWLEDGEMENT(ACK) FROM A TARGET BASE STATION

(71) Applicants: WILUS INSTITUTE OF STANDARDS AND TECHNOLOGY INC., Gyeonggi-do (KR); SK TELECOM CO., LTD., Seoul (KR)

(72) Inventors: Juhyung Son, Gyeonggi-do (KR); Jinsam Kwak, Gyeonggi-do (KR); Geonjung Ko, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 154 days.

(21) Appl. No.: 15/739,162

(22) PCT Filed: Jun. 29, 2016

(86) PCT No.: PCT/KR2016/006989
§ 371 (c)(1),
(2) Date: Dec. 22, 2017

(87) PCT Pub. No.: WO2017/003193
PCT Pub. Date: Jan. 5, 2017

(65) Prior Publication Data
US 2019/0306920 A1      Oct. 3, 2019

(30) Foreign Application Priority Data

Jun. 29, 2015 (KR) .......... 10-2015-0092531
Jul. 10, 2015 (KR) .......... 10-2015-0098711
Jul. 15, 2015 (KR) .......... 10-2015-0100686

(51) Int. Cl.
*H04W 80/08* (2009.01)
*H04L 5/00* (2006.01)
(Continued)

(52) U.S. Cl.
CPC .......... *H04W 80/08* (2013.01); *H04L 5/0055* (2013.01); *H04L 5/0094* (2013.01);
(Continued)

(58) Field of Classification Search
CPC ... H04W 80/08; H04W 74/004; H04W 80/02; H04W 74/0833; H04W 74/0808; H04W 72/0446; H04W 84/12; H04L 5/0055
See application file for complete search history.

(56) References Cited

U.S. PATENT DOCUMENTS 10,158,474 B2 * 12/2018 Cherian ................ H04L 1/1854
10,554,341 B2 *  2/2020 Dabeer ................. H04L 1/1671
(Continued)

FOREIGN PATENT DOCUMENTS

| WO | 2014/137172 | 9/2014 |
| WO | 2014/178502 | 11/2014 |
| WO | 2015/066440 | 5/2015 |

OTHER PUBLICATIONS

U.S. Appl. No. 62/163,984 "Kim" (Year: 2015).*
(Continued)

*Primary Examiner* — Ian N Moore
*Assistant Examiner* — Rushil Parimal Sampat
(74) *Attorney, Agent, or Firm* — Ladas & Parry, LLP

(57) ABSTRACT

In order to efficiently schedule data transmission of a plurality of terminals, the wireless communication terminal receives a trigger frame indicating uplink multi-user transmission, and transmits an uplink multi-user PPDU (PLCP Protocol Data Unit) in response to the received trigger frame. In this case, the trigger frame and the non-legacy
(Continued)

preamble of the uplink multi-user PPDU include remaining TXOP (Transmission Opportunity) time information of the uplink multi-user transmission process.

12 Claims, 19 Drawing Sheets

(51) Int. Cl.
　　　*H04W 72/04* 　　　(2009.01)
　　　*H04W 74/00* 　　　(2009.01)
　　　*H04W 74/08* 　　　(2009.01)
　　　*H04W 80/02* 　　　(2009.01)
　　　*H04L 27/26* 　　　(2006.01)
　　　*H04W 24/08* 　　　(2009.01)
　　　*H04W 84/12* 　　　(2009.01)

(52) U.S. Cl.
　　　CPC ......... *H04L 27/2613* (2013.01); *H04W 24/08* (2013.01); *H04W 72/0446* (2013.01); *H04W 74/004* (2013.01); *H04W 74/0808* (2013.01); *H04W 74/0833* (2013.01); *H04W 80/02* (2013.01); *H04W 84/12* (2013.01)

(56) References Cited

U.S. PATENT DOCUMENTS

| | | | | |
|---|---|---|---|---|
| 2009/0092110 | A1* | 4/2009 | Taki | H04L 1/0002 370/338 |
| 2014/0314004 | A1* | 10/2014 | Zhou | H04L 5/0055 370/329 |
| 2014/0341100 | A1* | 11/2014 | Sun | H04W 52/0216 370/311 |
| 2015/0063191 | A1* | 3/2015 | Merlin | H04L 47/12 370/312 |
| 2015/0063327 | A1 | 3/2015 | Barriac et al. | |
| 2015/0124689 | A1* | 5/2015 | Merlin | H04L 1/009 370/312 |
| 2015/0146808 | A1 | 5/2015 | Chu et al. | |
| 2015/0172996 | A1 | 6/2015 | Park et al. | |
| 2017/0063511 | A1* | 3/2017 | Kwon | H04L 1/18 |
| 2017/0295560 | A1* | 10/2017 | Kim | H04W 84/12 |

OTHER PUBLICATIONS

U.S. Appl. No. 62/157,921 "Cherian" (Year: 2015).*
U.S. Appl. No. 62/137,138, filed Mar. 23, 2015.*
International Search Report for PCT/KR2016/006989 dated Oct. 31, 2016 and its English translation from WIPO.
Written Opinion of the International Searching Authority for PCT/KR2016/006989 dated Oct. 31, 2016 and its English machine translation by Google Translate.
Office Action dated Feb. 26, 2021 for Korean Patent Application No. 10-2018-7001773 and its English translation provided by Applicant's foreign counsel.
Vida Ferdowski et al.: "Compressed Uplink Trigger Frame", IEEE 802.11-15/0856r1, Jul. 12, 2015. Slides 1-11.
Simone Merline t al.: "Trigger Frame Format", IEEE 802.11-15/0877r0, Jul. 13, 2015. Slides 1-14.
John (Ju-Hyung) Son et al.: "HE Trigger Frame Format", IEEE 802.11-15/0851r0, Jul. 13, 2015. Slides 1-10.
Office Action dated Aug. 25, 2021 for Korean Patent Application No. 10-2018-7001773 and its English translation provided by Applicant's foreign counsel.
Office Action dated Mar. 10, 2022 for Korean Patent Application No. 10-2022-7000821 and its English translation provided by Applicant's foreign counsel.
Office Action dated Mar. 29, 2022 for Korean Patent Application No. 10-2022-7000825 and its English translation provided by Applicant's foreign counsel.

* cited by examiner

*FIG. 21*

MULTI-USER(MU) TRANSMISSION FOR SOLICITING ACKNOWLEDGEMENT(ACK) FROM A TARGET BASE STATION

CROSS-REFERENCE TO RELATED APPLICATIONS

This application is the U.S. National Stage of International Patent Application No. PCT/KR2016/006989 filed on Jun. 29, 2016, which claims the priority to Korean Patent Application No. 10-2015-0092531 filed in the Korean Intellectual Property Office on Jun. 29, 2015, Korean Patent Application No. 10-2015-0098711 filed in the Korean Intellectual Property Office on Jul. 10, 2015, and Korean Patent Application No. 10-2015-0100686 filed in the Korean Intellectual Property Office on Jul. 15, 2015, the entire contents of which are incorporated herein by reference.

TECHNICAL FIELD

The present invention relates to a channel access method for data transmission, and a wireless communication method and a wireless communication terminal using the same, and more particularly, to a wireless communication method and a wireless communication terminal for efficiently scheduling data transmissions of a plurality of terminals.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

In addition, the present invention has an object to maximize resource utilization efficiency by performing efficient scheduling of an uplink multi-user transmission process.

In addition, the present invention has an object to control operations of terminals not participating in a transmission process in the uplink multi-user transmission process.

Technical Solution

In order to achieve the objects, the present invention provides a wireless communication method and a wireless communication terminal as below.

First, an exemplary embodiment of the present invention provides a wireless communication terminal for transmitting data through a multi-channel including a primary channel and at least one secondary channel, wherein the wireless communication terminal includes a processor and a transceiver, and wherein the processor transmits a first data through the multi-channel via the transceiver, performs a backoff procedure when the primary channel is idle for a predetermined first time after the transmission of the first data is completed, and switches to a transmission standby state when a backoff counter of the backoff procedure expires.

The processor may perform a first CCA procedure of the secondary channel for a predetermined second time before the backoff counter of the backoff procedure expires, and switch to the transmission standby state when the secondary channel is idle for the second time.

The processor may obtain a new backoff counter and perform a backoff procedure for the transmission standby stated using the new backoff counter when at least one secondary channel in which the first CCA procedure is performed is busy.

The predetermined first time may be an AIFS.

The second time may be longer than a PIFS.

When a second data to be transmitted occurs in the transmission standby state, the terminal may attempt to transmit the second data after performing a second CCA procedure of the primary channel and the secondary channel for a predetermined time without performing a separate backoff procedure.

The second CCA procedure of the secondary channel may be performed for a longer time than a PIFS.

The processor may obtain a new backoff counter and perform a backoff procedure for a transmission of the second data using the new backoff counter when at least one secondary channel is busy during the second CCA procedure of the primary channel and the secondary channel.

In addition, an exemplary embodiment of the present invention provides a wireless communication method of a wireless communication terminal for transmitting data through a multi-channel including a primary channel and at least one secondary channel, including: transmitting a first data through the multi-channel via a transceiver; performing a backoff procedure when the primary channel is idle for a predetermined first time after the transmission of the first data is completed; and switching to a transmission standby state when a backoff counter of the backoff procedure expires.

Next, another exemplary embodiment of the present invention provides a wireless communication terminal including a processor and a transceiver, wherein the processor receives a trigger frame indicating an uplink multi-user transmission, and transmits an uplink multi-user PLCP protocol data unit (PPDU) in response to the received trigger frame, wherein the trigger frame and a non-legacy preamble of the uplink multi-user PPDU contains remaining transmission opportunity (TXOP) time information of a current TXOP.

The remaining TXOP time information may be represented by a predetermined TXOP duration field of a high efficiency signal field A (HE-SIG-A) of the non-legacy preamble.

The TXOP duration field may consist of fewer bits than a TXOP field of a MAC header of a corresponding packet.

The TXOP duration field may indicate the remaining TXOP time information in a symbol unit.

The remaining TXOP time information may be represented based on a combination of a Length field and a Rate field of a legacy preamble, and a predetermined field of the non-legacy preamble of a corresponding packet.

An uplink multi-user transmission non-participating terminal that has received at least one of the trigger frame and the uplink multi-user PPDU may set a network allocation vector (NAV) based on the remaining TXOP time information.

When an additional uplink multi-user transmission process is performed within the current TXOP, an M-STA BA corresponding to the uplink multi-user PPDU and a next trigger frame indicating the additional uplink multi-user transmission may be aggregated and transmitted in a single A-MPDU.

In addition, another exemplary embodiment of the present invention provides a wireless communication method of a wireless communication terminal, including: receiving a trigger frame indicating an uplink multi-user transmission, and transmitting an uplink multi-user PLCP protocol data unit (PPDU) in response to the received trigger frame, wherein the trigger frame and a non-legacy preamble of the uplink multi-user PPDU contains remaining transmission opportunity (TXOP) time information of a current TXOP.

Advantageous Effects

According to the embodiment of the present invention, the reliability of the uplink multi-user transmission can be ensured and the performance thereof can be improved through efficient scheduling.

According to an embodiment of the present invention, an efficient channel access method of each terminal is provided through a post backoff procedure in a multi-channel uplink multi-user transmission.

According to another embodiment of the present invention, by inserting TXOP information into a preamble of a non-legacy packet, neighboring terminals can obtain TXOP information and set a NAV in early stages.

According to an embodiment of the present invention, it is possible to increase the total resource utilization rate in the contention-based channel access system and improve the performance of the wireless LAN system.

DESCRIPTION OF DRAWINGS

FIG. 21 illustrates a further embodiment of a downlink multi-user transmission process.

DETAILED DESCRIPTION OF THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2015-0092531, 10-2015-0098711 and 10-2015-0100686 filed in the Korean Intellectual Property Office and the embodiments and mentioned items described in the respective application, which forms the basis of the priority, shall be included in the Detailed Description of the present application.

Figure 1:
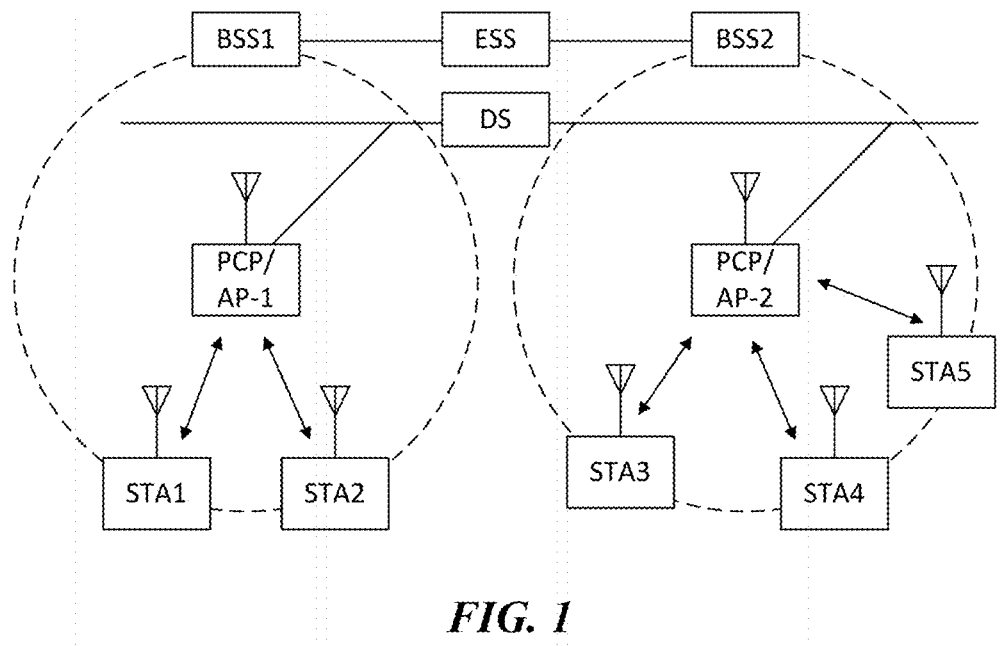
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
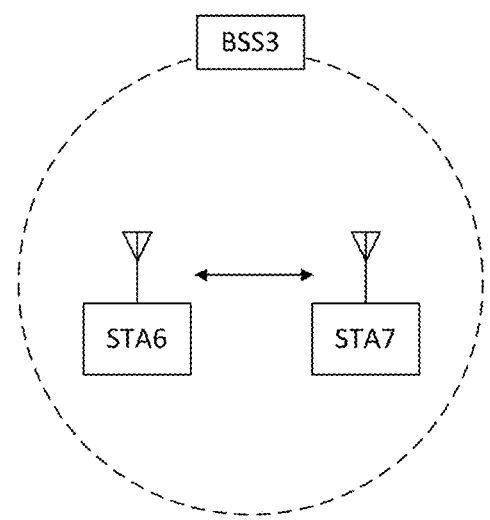
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
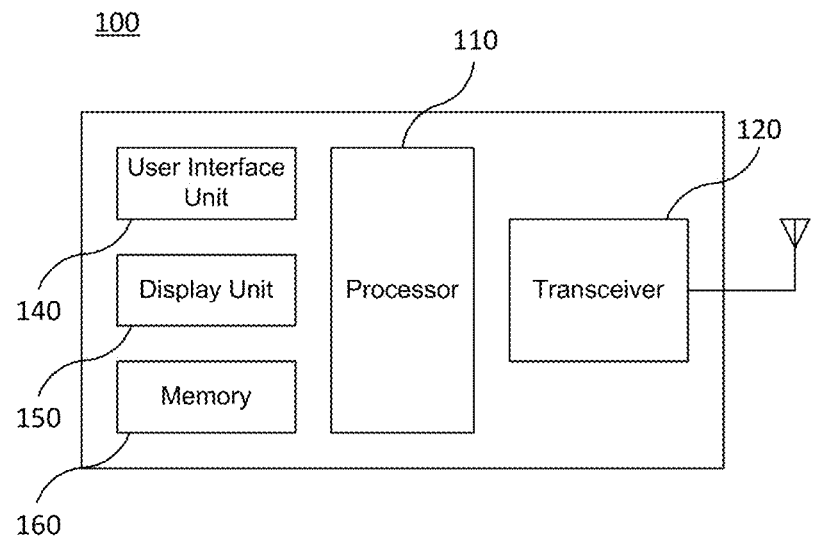
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip. In an embodiment of the present invention, the transceiver 120 may represent a radio frequency (RF) transceiver module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. That is, the processor 110 may be a modem or a modulator/demodulator for modulating and demodulating wireless signals transmitted to and received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
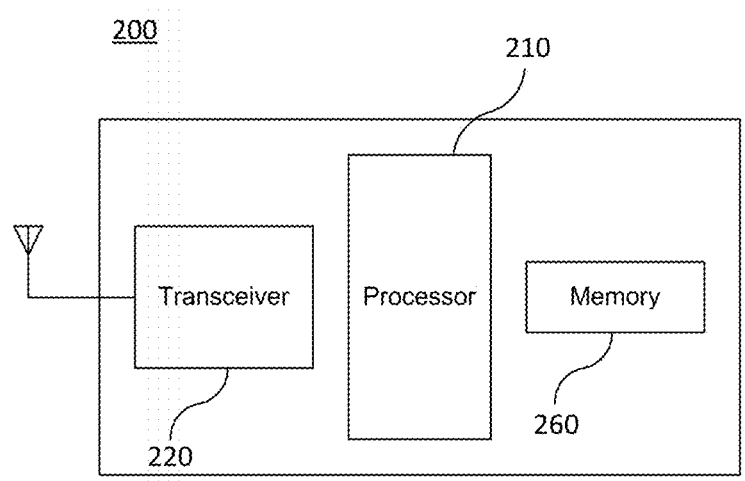
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200. In an embodiment of the present invention, the transceiver 220 may represent a radio frequency (RF) transceiver module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the transceiver 220. The processor 210 controls various operations such as wireless signal transmission/reception of the AP 200 according to the embodiment of the present invention. A detailed embodiment thereof will be described below.

Figure 5:
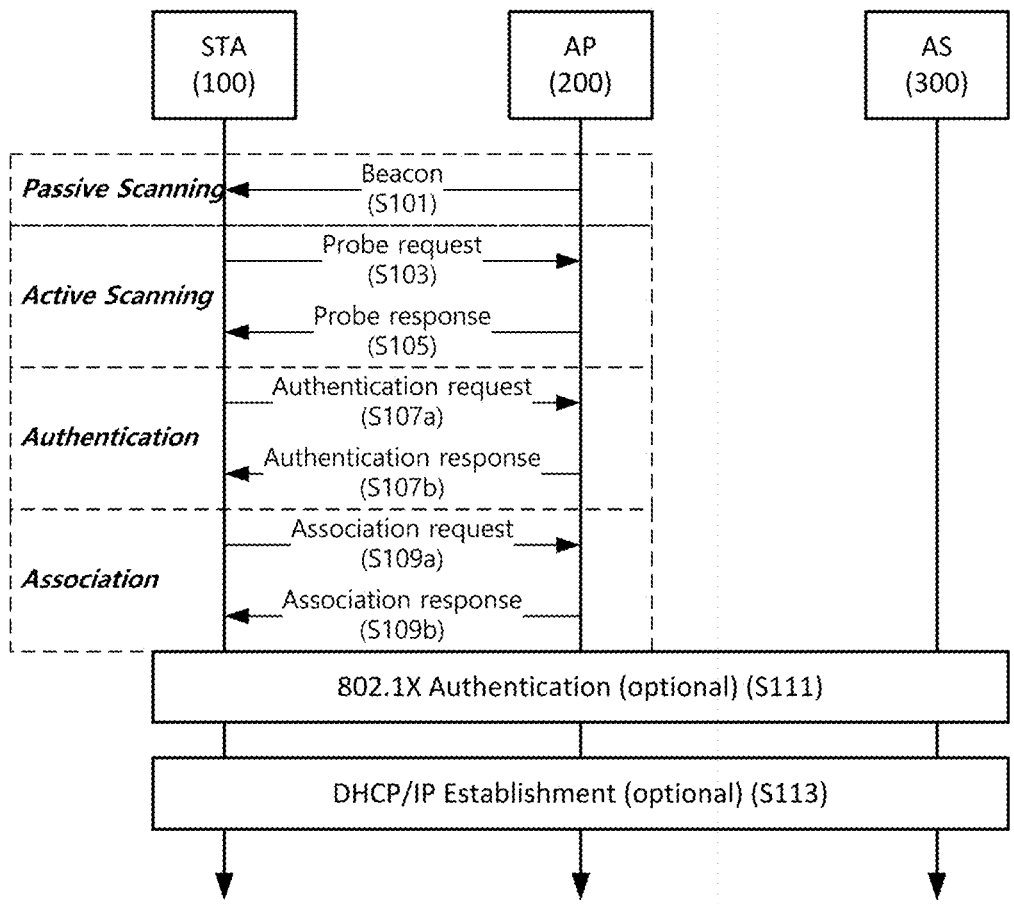
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
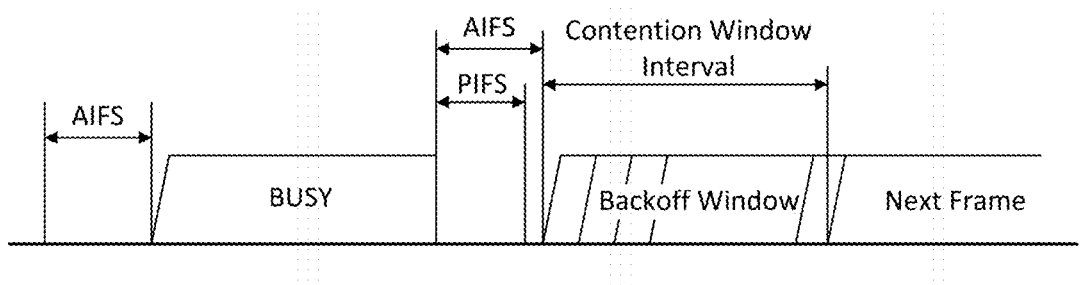
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
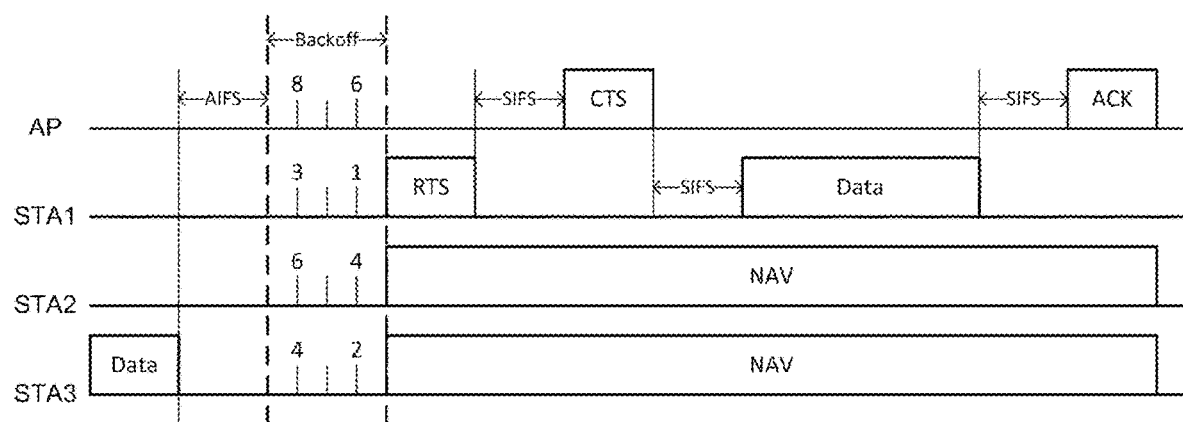
FIG. 7 illustrates a method for performing a distributed coordination function (DCF) using a request to send (RTS) frame and a clear to send (CTS) frame.

FIG. 7 is a diagram illustrating a method for performing a distributed coordination function using a request to send (RTS) frame and a clear to send (CTS) frame.

The AP and STAs in the BSS contend in order to obtain an authority for transmitting data. When data transmission at the previous step is completed, each terminal having data to be transmitted performs a backoff procedure while decreasing a backoff counter (alternatively, a backoff timer) of a random number assigned to each terminal after an AFIS time. A transmitting terminal in which the backoff counter expires transmits the request to send (RTS) frame to notify that corresponding terminal has data to transmit. According to an exemplary embodiment of FIG. 7, STA1 which holds a lead in contention with minimum backoff may transmit the RTS frame after the backoff counter expires. The RTS frame includes information on a receiver address, a transmitter address, and duration. A receiving terminal (i.e., the AP in FIG. 7) that receives the RTS frame transmits the clear to send (CTS) frame after waiting for a short IFS (SIFS) time to notify that the data transmission is available to the transmitting terminal STA1. The CTS frame includes the information on a receiver address and duration. In this case, the receiver address of the CTS frame may be set identically to a transmitter address of the RTS frame corresponding thereto, that is, an address of the transmitting terminal STA1.

The transmitting terminal STA1 that receives the CTS frame transmits the data after a SIFS time. When the data transmission is completed, the receiving terminal AP transmits an acknowledgment (ACK) frame after a SIFS time to notify that the data transmission is completed. When the transmitting terminal receives the ACK frame within a predetermined time, the transmitting terminal regards that the data transmission is successful. However, when the transmitting terminal does not receive the ACK frame within the predetermined time, the transmitting terminal regards that the data transmission is failed. Meanwhile, adjacent terminals that receive at least one of the RTS frame and the CTS frame in the course of the transmission procedure set a network allocation vector (NAV) and do not perform data transmission until the set NAV is terminated. In this case, the NAV of each terminal may be set based on a duration field of the received RTS frame or CTS frame.

In the course of the aforementioned data transmission procedure, when the RTS frame or CTS frame of the terminals is not normally transferred to a target terminal (i.e., a terminal of the receiver address) due to a situation such as interference or a collision, a subsequent process is suspended. The transmitting terminal STA1 that transmitted the RTS frame regards that the data transmission is unavailable and participates in a next contention by being assigned with a new random number. In this case, the newly assigned random number may be determined within a range (2*CW) twice larger than a previous predetermined random number range (a contention window, CW).

<Multi-User Transmission>

When using orthogonal frequency division multiple access (OFDMA) or multi-input multi-output (MIMO), one wireless communication terminal can simultaneously transmit data to a plurality of wireless communication terminals. Further, one wireless communication terminal can simultaneously receive data from a plurality of wireless communication terminals. For example, a downlink multi-user (DL-MU) transmission in which an AP simultaneously transmits data to a plurality of STAs, and an uplink multi-user (UL-MU) transmission in which a plurality of STAs simultaneously transmit data to the AP may be performed.

In order to perform the UL-MU transmission, the channel to be used and the transmission start time of each STA that performs uplink transmission should be adjusted. In order to efficiently schedule the UL-MU transmission, state information of each STA needs to be transmitted to the AP. According to an embodiment of the present invention, information for scheduling of a UL-MU transmission may be indicated through a predetermined field of a preamble of a packet and/or a predetermined field of a MAC header. For example, a STA may indicate information for UL-MU transmission scheduling through a predetermined field of a preamble or a MAC header of an uplink transmission packet, and may transmit the information to an AP. In this case, the information for UL-MU transmission scheduling includes at least one of buffer status information of each STA, channel state information measured by each STA. The buffer status information of the STA may indicate at least one of whether the STA has uplink data to be transmitted, the access category (AC) of the uplink data and the size (or the transmission time) of the uplink data.

According to an embodiment of the present invention, the UL-MU transmission process may be managed by the AP. The UL-MU transmission may be performed in response to a trigger frame transmitted by the AP. The STAs simultaneously transmit uplink data a predetermined IFS time after receiving the trigger frame. The trigger frame indicates the data transmission time point of the uplink STAs and may inform the channel (or subchannel) information allocated to the uplink STAs. When the AP transmits the trigger frame, a plurality of STAs transmit uplink data through the respective allocated subcarriers at a time point designated by the trigger frame. After the uplink data transmission is completed, the AP transmits an ACK to the STAs that have successfully transmitted the uplink data. In this case, the AP may transmit a predetermined multi-STA block ACK (M-BA) as an ACK for a plurality of STAs.

In the non-legacy wireless LAN system, a specific number, for example, 26, 52, or 106 tones may be used as a resource unit (RU) for a subchannel-based access in a channel of 20 MHz band. Accordingly, the trigger frame may indicate identification information of each STA participating in the UL-MU transmission and information of the allocated resource unit. The identification information of the STA includes at least one of an association ID (AID), a partial AID, and a MAC address of the STA. Further, the information of the resource unit includes the size and placement information of the resource unit.

On the other hand, in the non-legacy wireless LAN system, a UL-MU transmission may be performed based on a contention of a plurality of STAs for a particular resource unit. For example, if an AID field value for a particular resource unit is set to a specific value (e.g., 0) that is not assigned to STAs, a plurality of STAs may attempt random access (RA) for the corresponding resource unit.

<Multi-Channel Downlink/Uplink Transmission>

In the wireless LAN system, terminals of each BSS set a specific channel as a primary channel to perform communication. The primary channel is a channel used by non-AP STAs to associate with an AP. The transmission bandwidth of data can be extended from a basic 20 MHz to 40 MHz, 80 MHz, 160 MHz and the like. On the other hand, a secondary channel may be aggregated with the primary channel to form a channel having a bandwidth twice or more.

The terminals of the BSS perform a CCA on each channel to check whether the corresponding channel is busy, and perform bandwidth extension based on the channel determined to be idle. That is, by assuming 20 MHz as a basic bandwidth, the terminal may extend the transmission bandwidth to 40 MHz, 80 MHz, 160 MHz, and the like, according to whether the channels adjacent to the primary channel are idle. If the transmission bandwidth is extended to non-contiguous channels, the transmission bandwidth can be extended to various channel configurations such as 20+20 MHz, 20+40 MHz, 40+20 MHz, 60 MHz, and the like. The terminal may transmit downlink data or uplink data using the extended multi-channel transmission bandwidth.

Hereinafter, channel access methods for multi-channel downlink transmission and uplink transmission will be described with reference to FIGS. 8 to 11. In each embodiment, CH1, CH2, CH3 and CH4 represent channels in units of 20 MHz, respectively. However, the bandwidth of each channel may be changed according to the communication method to which the present invention is applied. In each embodiment, CH1 denotes a primary channel, and CH2 to CH4 denote secondary channels. In each embodiment shown in FIGS. 8 to 11, duplicative description of parts which are the same as or corresponding to the previous embodiment will be omitted.

Figure 8:
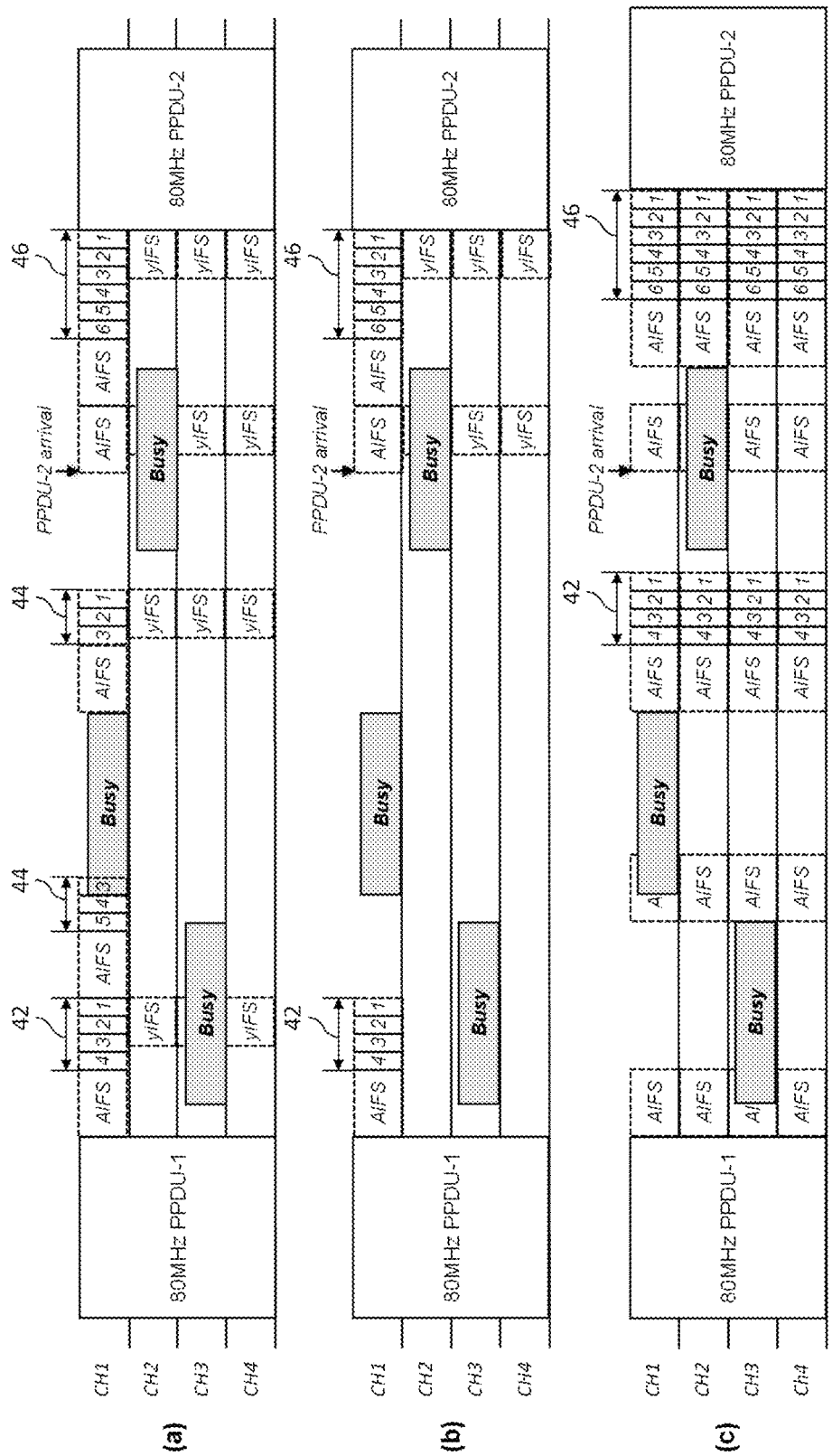
FIG. 8 illustrates a channel access method for a multi-channel downlink/uplink transmission according to an embodiment of the present invention.

FIG. 8 illustrates a channel access method for a multi-channel downlink/uplink transmission according to an embodiment of the present invention. In the embodiment of FIG. 8, the terminal transmits a PLCP protocol data unit (PPDU) using an 80 MHz bandwidth.

In each embodiment, after the completion of a transmission of first data (e.g., PPDU-1), the AP may perform a post backoff procedure for the multi-channel before the generation of second data (e.g., PPDU-2) to be transmitted next. In the case of a downlink transmission, the first data and the second data represent downlink data, and in the case of an uplink transmission, the first data and the second data represent uplink data. According to a further embodiment of the present invention, the first data may represent downlink data transmitted by an AP, and the second data may represent uplink data transmitted by a STA.

In the embodiment of the present invention, the post backoff procedure indicates a backoff procedure that is performed in advance for the next channel access after the data transmission of the terminal is completed. If the channel is idle for an AIFS time after data transmission is completed, the terminal performs a new backoff procedure. In this case, the terminal obtains a new backoff counter within a contention window and performs a new backoff procedure based on the obtained backoff counter. According to an embodiment, the post backoff procedure may indicate a backoff procedure performed while data to be transmitted by the corresponding terminal is not present yet.

When the back off counter of the post back off procedure expires, the terminal is in a transmission standby state. If data to be transmitted occurs in the transmission standby state, the terminal may attempt to transmit the data after a CCA for a predetermined time without performing a separate backoff procedure. More specifically, the terminal performs a CCA respectively for an AIFS time in the primary channel and for a predetermined time in the secondary channel, and immediately performs a transmission of the corresponding data when all the channels in which the CCA is performed are idle.

First, FIG. 8(a) shows a process of transmitting a PPDU using an 80 MHz bandwidth. After the transmission of the first data (e.g., PPDU-1) in the 80 MHz band is completed, the terminal performs a CCA of the primary channel CH1 for an AIFS time. If the channel is idle for an AIFS time, the terminal performs a post back off procedure in the primary channel. That is, the terminal performs a CCA by decrementing a randomly selected backoff counter value within the contention window by one. The terminal performs a CCA on the secondary channels through which data is to be transmitted for a predetermined yIFS time before the backoff counter of the backoff procedure expires. In the embodiment of the present invention, yIFS denotes 'PIFS+n*slot time' (herein, n is an integer greater than or equal to 1). That is, the terminal may perform the CCA on the secondary channels for a longer time than the PIFS. According to an embodiment, when at least one secondary channel is busy during the yIFS time, the post backoff procedure for the multi-channel may be determined as failed.

In the example of FIG. 8(a), the terminal assigns a backoff counter 4 in the first post backoff procedure 42. The CH3 is busy during the yIFS time before the backoff counter of the first post backoff procedure 42 expires and the backoff procedure 42 is determined to be failed. The terminal performs the second post backoff procedure 44 based on a new backoff counter after an AIFS time. According to an embodiment, the terminal may double the size of the contention window and obtain a new backoff counter within the increased contention window. In the second post backoff procedure 44, the terminal assigns a backoff counter 5. However, during the second post backoff procedure 44, CH1 becomes a busy state and the backoff procedure 44 is suspended. Thereafter, when the CH1 becomes idle again, the terminal resumes the second post backoff procedure 44 after an AIFS time. All the secondary channels are idle for the yIFS time before the backoff counter of the second post backoff procedure 44 expires, and the corresponding backoff procedure 44 is successfully terminated. In this case, the contention window is reset to an initial value.

When the second post backoff procedure 44 is successfully terminated, the terminal is in the data transmission standby state. If the second data (e.g., PPDU-2) to be transmitted occurs in the transmission standby state, the terminal may immediately attempt to transmit the corresponding data (e.g., PPDU-2) without performing a separate backoff procedure. The terminal performs a CCA for a predetermined time for the data transmission. In this case, the terminal performs the CCA for an AIFS time in the primary channel CH1 and for a yIFS time in the secondary channels CH2, CH3 and CH4. If all the channels in which the CCA is performed are idle, the terminal performs a transmission of the second data (e.g., PPDU-2). However, if at least one channel among the channels in which the CCA is performed is busy, the terminal performs a new backoff procedure 46. In the embodiment of FIG. 8(a), the terminal transmits the second data (e.g., PPDU-2) after the new backoff procedure 46 is terminated.

According to the embodiment of the present invention, the terminal may perform the CCA for a predetermined yIFS time using various methods. First, the terminal may perform the CCA using an energy detection technique. That is, the terminal checks whether a level of any received signal is higher than a preset ED threshold. Next, the terminal may perform the CCA using a correlation detection technique. According to an exemplary embodiment, the terminal may detect a pattern in which a cyclic prefix (CP) of an 64 FFT-based orthogonal frequency domain multiplexing (OFDM) symbol is periodically repeated, and may check whether the level of the corresponding signal is higher than a preset CD threshold (e.g., CD threshold-1). In this case, the length of the CP is 0.4 us or 0.8 us. According to another embodiment, the terminal may detect a pattern in which a CP of a 256 FFT-based OFDM symbol is periodically repeated, and may check whether the level of the corresponding signal is higher than a preset CD threshold (e.g., CD threshold-2). In this case, the length of the CP is 0.8 us, 1.6 us, or 3.2 us. In this case, the terminal can quickly detect the pattern through a long OFDM symbol length and a CP length different from that of the conventional 64 FFT. According to yet another embodiment, the terminal may check whether the level of an OFDM signal detected at intervals of 78.125 kHz according to the frequency characteristic of 256 FFT-based OFDM is higher than a predetermined CD threshold (e.g., CD threshold-3).

Next, FIG. 8(b) shows another embodiment of transmitting a PPDU using an 80 MHz bandwidth. The terminal may perform the post backoff procedure 42 similar to the embodiment of FIG. 8(a). However, the terminal may omit the CCA of the secondary channels CH2, CH3 and CH4 for the predetermined yIFS time in the post backoff procedure 42. That is, the terminal performs the CCA of the secondary channels CH2, CH3 and CH4 for the yIFS time only in the backoff procedure that proceeds with having data to be transmitted.

Referring to FIG. 8(b), when the backoff counter of the post backoff procedure 42 expires, the terminal is in a transmission standby state. In the post backoff procedure 42, the terminal performs a CCA only for the primary channel CH1 and does not perform a CCA for the secondary channels CH2, CH3 and CH4. The terminal waits until data to be transmitted occurs. When the second data (e.g., PPDU-2) to be transmitted occurs, the terminal performs a CCA for a predetermined time in the primary channel CH1 and the secondary channels CH2, CH3 and CH4 for a data transmission. In this case, the terminal performs the CCA for an AIFS time in the primary channel CH1 and for a yIFS time in the secondary channels CH2, CH3 and CH4. If all the channels in which the CCA is performed are idle, the terminal performs a transmission of the second data (e.g., PPDU-2). However, since CH2 is in a busy state, the terminal performs a new backoff procedure 46. The terminal transmits the second data (e.g., PPDU-2) after the new backoff procedure 46 is terminated.

Next, FIG. 8(c) shows yet another embodiment of transmitting a PPDU using an 80 MHz bandwidth. According to yet another embodiment of the present invention, the terminal may perform a CCA for an AIFS time in all the transmission channels CH1, CH2, CH3 and CH4 after the data transmission is completed, and may perform the post backoff procedure 42 when all the channels in which the CCA is performed are idle. Referring to FIG. 8(c), after the transmission of the first data (e.g., PPDU-1) is completed, the terminal performs a CCA for the AIFS time in the primary channel CH1 and the secondary channels CH2, CH3 and CH4. However, since CH3 is in a busy state, the terminal postpones the post backoff procedure 42. After CH3 becomes idle, the terminal performs the CCA for an AIFS time in all the transmission channels CH1, CH2, CH3 and CH4 again. However, since CH1 is in a busy state, the terminal postpones the post backoff procedure 42 again. After CH1 becomes idle, the terminal performs the CCA for an AIFS time in all the transmission channels CH1, CH2, CH3 and CH4 again. Since all the channels in which the CCA is performed are idle, the terminal performs the post backoff procedure 42.

According to the embodiment of FIG. 8(c), the post backoff procedure 42 is performed in all the transmission channels CH1, CH2, CH3 and CH4. That is, the terminal performs the post backoff procedure 42 in the primary channel CH1 and the secondary channels CH2, CH3 and CH4 using the obtained backoff counter. If at least one channel becomes busy during the post back off procedure 42, the post backoff procedure 42 is suspended. When the post backoff procedure 42 is terminated, the terminal is in a transmission standby state.

When the second data (e.g., PPDU-2) to be transmitted occurs, the terminal performs a CCA for a predetermined time in the primary channel CH1 and the secondary channels CH2, CH3 and CH4 for a data transmission. In this case, the terminal performs the CCA for an AIFS time in the primary channel CH1 and the secondary channels CH2, CH3 and CH4. If all the channels in which the CCA is performed are idle, the terminal performs a transmission of the second data (e.g., PPDU-2). However, since CH2 is in a busy state, the terminal performs a new backoff procedure 46. The terminal transmits the second data (e.g., PPDU-2) after the new backoff procedure 46 is terminated. According to an embodiment, the terminal may perform the new backoff procedure 46 in all the transmission channels CH1, CH2, CH3 and CH4.

According to still another embodiment, the first data (e.g., PPDU-1) may be downlink data and the second data (e.g., PPDU-2) may be uplink data. When the AP signals a non-AP of a success of the post backoff procedure following the downlink data transmission as shown in FIG. 8, the non-AP STA may transmit uplink data after briefly performing a backoff procedure of the uplink data transmission using the corresponding information as shown in FIG. 8.

Figure 9:
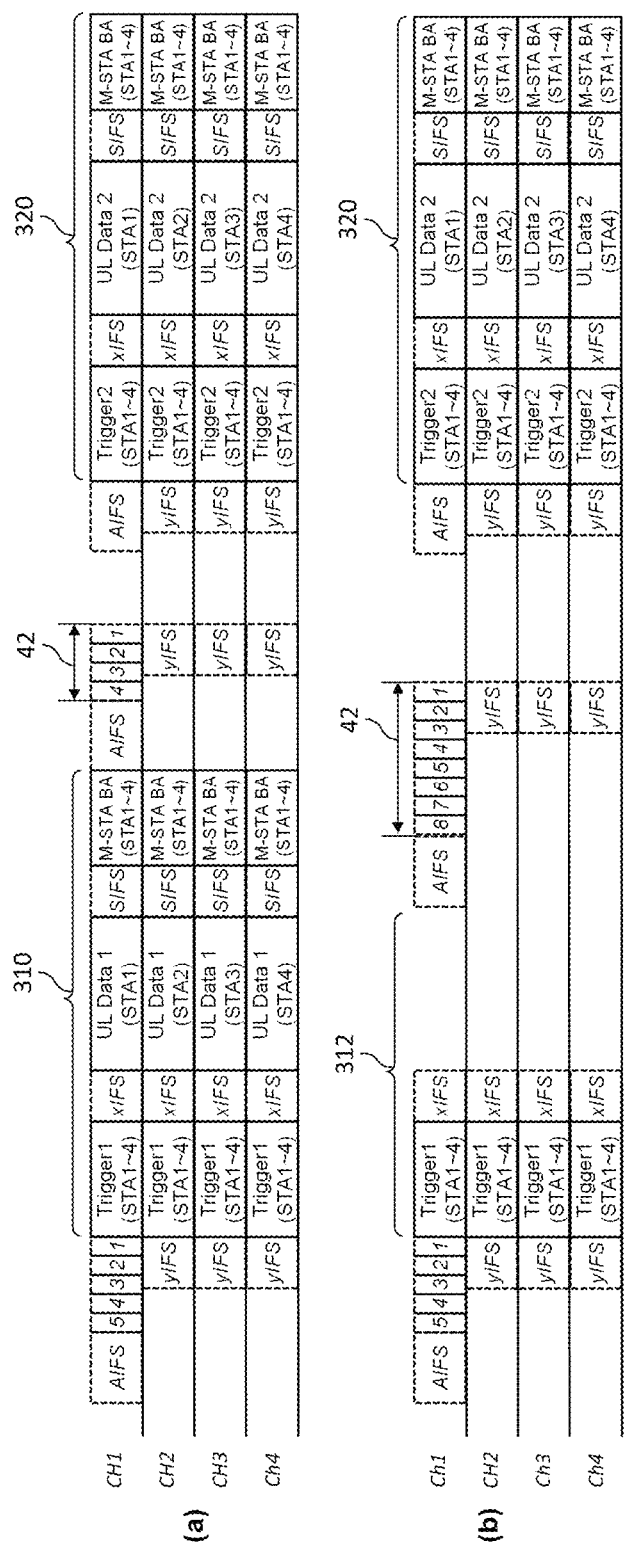
FIG. 9 illustrates a channel access method for a multi-channel uplink multi-user transmission according to an embodiment of the present invention.

FIG. 9 illustrates a channel access method for a multi-channel uplink multi-user transmission according to an embodiment of the present invention. In the embodiment of FIG. 9, a UL-MU transmission process is performed using an 80 MHz bandwidth including CH1, CH2, CH3 and CH4. In this case, STA1, STA2, STA3 and STA4 are allocated to CH1, CH2, CH3 and CH4, respectively, to transmit uplink data.

First, FIG. 9(a) shows a multi-channel UL-MU transmission process according to an embodiment of the present invention. The AP performs a backoff procedure for the initiation of a UL-MU transmission process 310. When the backoff counter of the backoff procedure expires, the AP transmits a trigger frame (e.g., Trigger 1). In the embodiment of FIG. 9(a), the trigger frame transmitted by the AP contains resource allocation information for STA1 to STA4. STA1 to STA4 which have received the trigger frame transmit uplink multi-user data (e.g., UL Data 1) through respective allocated resource units after a xIFS time. According to an embodiment, the xIFS is a SIFS. The AP receives uplink multi-user data transmitted by the STA1 to STA4 and transmits a multi-STA block ACK (M-STA BA) after a SIFS time in response thereto.

According to the embodiment of the present invention, after the UL-MU transmission process 310 is completed, the AP performs a post backoff procedure 42 for multi-channels. As described in the previous embodiment, the post backoff procedure 42 for the multi-channel includes a backoff procedure in the primary channel CH1 and a CCA for a predetermined yIFS time in the secondary channels CH2, CH3 and CH4. When the post backoff procedure 42 for the multi-channel is successfully terminated, the AP is in a transmission standby state. The AP receives buffer status report from STAs and starts the next UL-MU transmission process 320 based on the received buffer status report. In this case, the AP may start the UL-MU transmission process 320 after performing a CCA for a predetermined time without performing a separate backoff procedure. That is, the AP performs the CCA for the AIFS time in the primary channel CH1 and for the yIFS time in the secondary channels CH2, CH3 and CH4, transmits a trigger frame (e.g., Trigger 2) when all the channels in which the CCA is performed are idle.

FIG. 9(b) shows a post backoff procedure when the UL-MU transmission process has failed. The AP transmits a trigger frame (e.g., Trigger 1) for the initiation of a UL-MU transmission process 312. However, if no uplink data corresponding to the trigger frame is received at all, the AP determines that the UL-MU transmission process 312 has failed. In this case, the AP may perform a multi-channel post backoff procedure 42 for the next transmission. Since the previous UL-MU transmission process 312 has failed, the AP doubles the size of the contention window and obtains a new backoff counter within the increased contention window. Thereafter, the AP performs the post backoff procedure 42 using the new backoff counter. According to an embodiment, the post backoff procedure 42 may be performed after a time when it is determined that the UL-MU transmission process 312 designated by the trigger frame has not been performed.

On the other hand, when at least one uplink data is received, the AP may determine that the UL-MU transmission process is successful. In this case, the AP may reset the contention window used in the previous backoff procedure to an initial value, obtain a new backoff counter based thereon, and perform a post backoff procedure for the next transmission using the new backoff counter.

Figure 10:
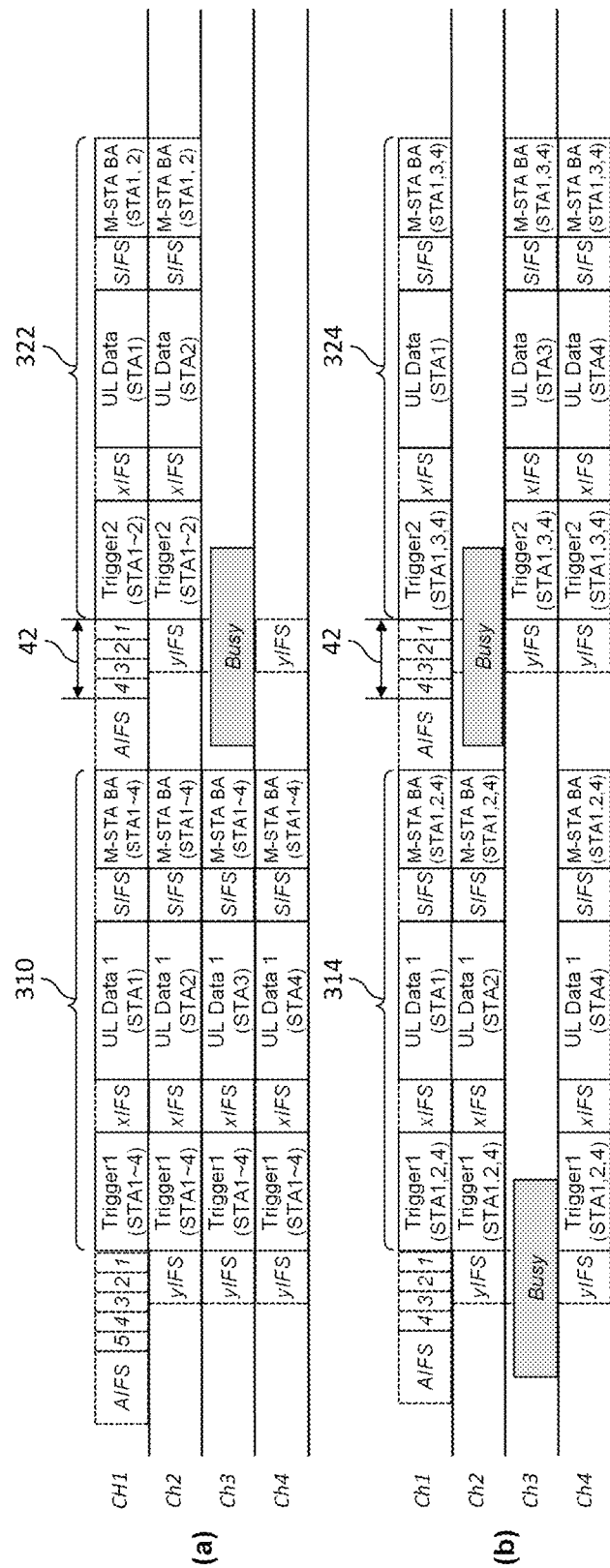
FIG. 10 illustrates a channel access method for a multi-channel uplink multi-user transmission according to another embodiment of the present invention.

FIG. 10 illustrates a channel access method for a multi-channel uplink multi-user transmission according to another embodiment of the present invention. FIG. 10(a) shows a contiguous multi-channel transmission method, and FIG. 10(b) shows a non-contiguous multi-channel transmission method.

First, referring to FIG. 10(a), after the UL-MU transmission process 310 is completed, the AP performs the post backoff procedure 42 for the multi-channel. The AP performs the CCA procedure for the yIFS time for the secondary channels CH2, CH3 and CH4 in the post backoff procedure 42. When the backoff counter of the post backoff procedure 42 expires, the AP may immediately transmit a trigger frame (e.g., Trigger2) for the initiation of the next UL-MU transmission process 322. Since CH3 is busy in the CCA procedure, the AP transmits the trigger frame (e.g., Trigger2) through a 40 MHz channel including CH1 and CH2 based on a contiguous channel extension principle. The trigger frame (e.g., Trigger2) contains resource allocation information for the STA1 and the STA2 allocated to CH1 and CH2, respectively. In the UL-MU transmission process 322, STA1 and STA2 transmit uplink multi-user data using CH1 and CH2.

Next, referring to FIG. 10(b), UL-MU transmission processes 314 and 324 may be performed based on a non-contiguous channel extension principle. The AP performs the backoff procedure and the CCA procedure for the secondary channels CH2, CH3 and CH4 for the initiation of the UL-MU transmission process 312. In this case, since CH3 is busy, the AP transmits a trigger frame (e.g., Trigger1) through a 40 MHz channel including CH1 and CH2 and a 20 MHz channel of CH4. The trigger frame (e.g., Trigger1) contains resource allocation information for STA1, STA2 and STA4 allocated CH1, CH2 and CH4, respectively. In the UL-MU transmission process 314, STA1, STA2 and STA4 transmit uplink multi-user data.

When the UL-MU transmission process 312 is completed, the AP performs the post backoff procedure 42 for the multi-channel. The AP performs the CCA procedure for the yIFS time for the secondary channels CH2, CH3 and CH4. In the embodiment of FIG. 10(b), CH2 is busy. The AP transmits a trigger frame (e.g., Trigger2) through a 20 MHz channel of CH1 and a 40 MHz channel including CH3 and CH4 based on the non-contiguous channel extension principle. The trigger frame (e.g., Trigger2) includes resource allocation information for STA1, STA3 and STA4 allocated CH1, CH3 and CH4, respectively. In the UL-MU transmission process 324, STA1, STA3 and STA4 transmit uplink multi-user data.

Figure 11:
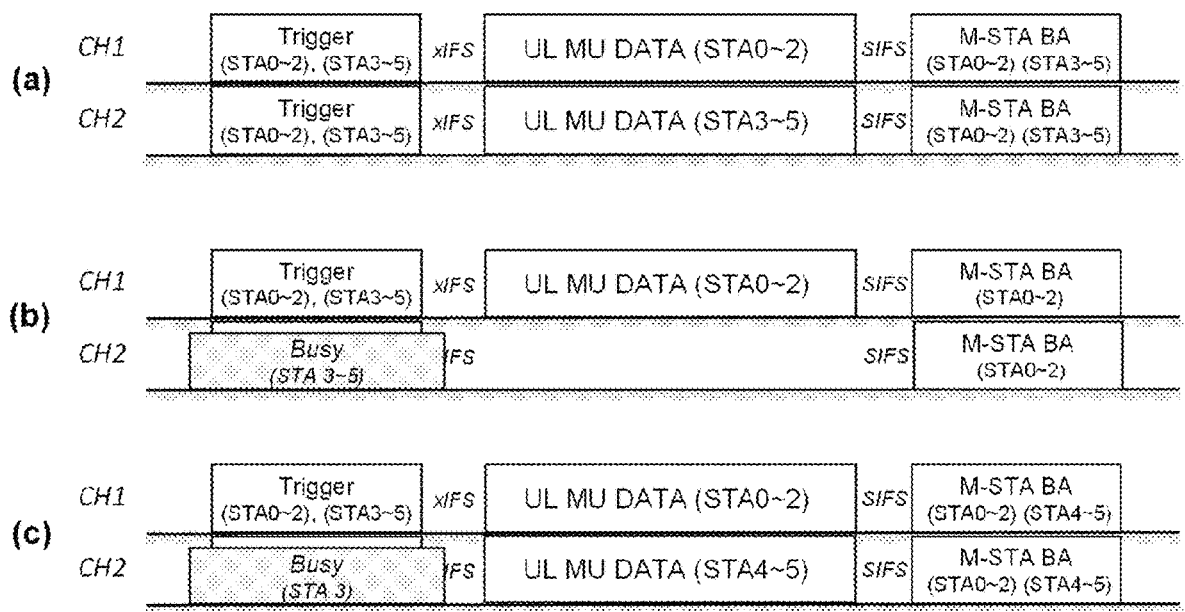
FIG. 11 illustrates a multi-channel uplink multi-user transmission method according to yet another embodiment of the present invention.

FIG. 11 illustrates a multi-channel uplink multi-user transmission method according to yet another embodiment of the present invention. In the embodiment of FIG. 11, a UL-MU transmission process is performed using a 40 MHz bandwidth including CH1 and CH2. In this case, it is assumed that STA0, STA1 and STA2 are allocated to CH1, and STA3, STA4 and STA5 are allocated to CH2.

First, referring to FIG. 11(a), the AP transmits a trigger frame through CH1 and CH2. The trigger frame transmitted by the AP indicates that STA0, STA1 and STA2 to transmit uplink multi-user data through CH1, and that STA3, STA4 and STA5 to transmit uplink multi-user data through CH2. Each STA receiving the trigger frame transmits uplink multi-user data through a channel assigned to each terminal after performing a CCA for xIFS time. According to an embodiment, the xIFS is a SIFS. The AP receives the uplink multi-user data transmitted by the STA0 to STA5 and transmits an M-STA BA after a SIFS time in response thereto.

The embodiment of FIG. 11(b) shows a situation in which CH2 is busy when the trigger frame is transmitted by the AP. STA3, STA4 and STA5 cannot transmit uplink data corresponding to the trigger frame since the CH2 allocated to the terminals is busy. The AP receives uplink multi-user data transmitted by STA0, STA1 and STA2 through CH1 and transmits an M-STA BA in response thereto. The M-STA BA transmitted by the AP contains ACK information for STA0, STA1 and STA2. According to the embodiment of the present invention, the AP may transmit the M-STA BA not only through CH1 but also through CH2 in which UL-MU transmission is not performed. As described above, the AP may transmit the M-STA BA through a channel in which the UL-MU transmission has failed, thereby securing resources for the next multi-channel transmission process.

The embodiment of FIG. 11(c) shows a situation in which CH2 is busy only for STA3 when the trigger frame is transmitted by the AP. The STA3 cannot transmit uplink data corresponding to the trigger frame since the CH2 allocated to the terminal is busy. The AP receives uplink multi-user data transmitted by STA0, STA1 and STA2 through CH1 and uplink multi-user data transmitted by STA4 and STA5 through CH2. The AP transmits an M-STA BA in response to the received uplink multi-user data. The M-STA BA transmitted by the AP contains ACK information for STA0, STA1, STA2, STA4 and STA5.

Meanwhile, according to a further embodiment of the present invention, the resource allocation information of the trigger frame may be transmitted in duplicate in units of 20 MHz channels. That is, in the above embodiments, the allocation information of CH1 for STA0 to STA2 and allocation information of CH2 for STA3 to STA5 are transmitted together through CH1 and CH2. Accordingly, the STAs can obtain the resource allocation information of the entire bandwidth in which the UL-MU transmission is performed from a trigger frame received via at least one channel. In the embodiments of FIGS. 11(b) and 11(c), even if a channel allocated to a specific STA is busy at the time when the trigger frame is transmitted by the AP, the corresponding STA may transmit uplink multi-user data based on the resource allocation information of the trigger frame received via the other channel.

Figure 12:
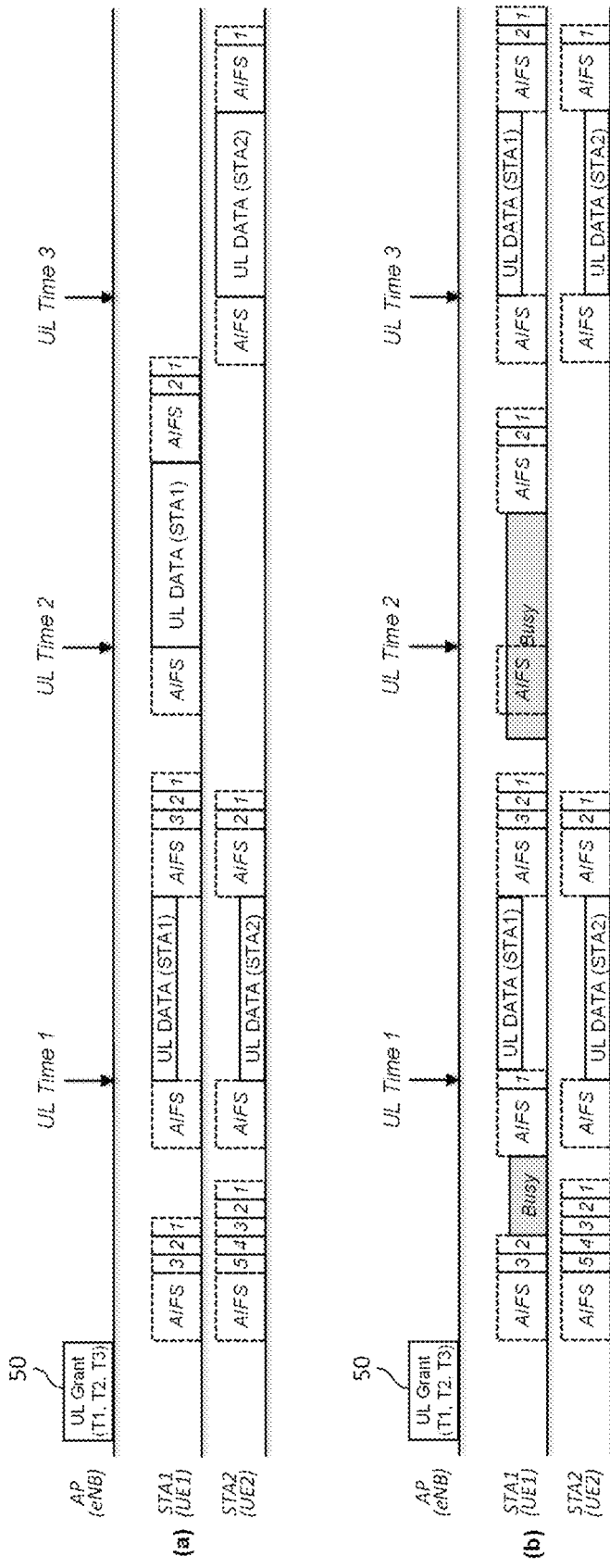
FIG. 12 illustrates a periodic uplink multi-user data transmission method according to a further embodiment of the present invention.

FIG. 12 illustrates a periodic uplink multi-user data transmission method according to a further embodiment of the present invention. According to a further embodiment of the present invention, the terminal may transmit data at a predetermined transmission timing (e.g., UL Time 1, UL Time 2, UL Time 3). The predetermined transmission timing may be a synchronized timing. As in other embodiments of the present invention, in the embodiment of FIG. 12, the AP and the STA may be replaced by enhanced Node B (eNB) and user equipment (UE), respectively.

According to the embodiment of FIG. 12, the AP transmits an uplink grant message 50 to STA1 and STA2. In the embodiment of the present invention, the uplink grant message 50 includes the above-described trigger frame, and may further include various types of messages indicating uplink transmission of a terminal. In the uplink grant message 50, transmission timing information, transmission period information, and the like, for transmitting uplink data may be indicated for each STA.

The STAs may perform a backoff procedure in advance before the designated transmission timing to determine whether to transmit uplink data at the corresponding transmission timing. In this case, the backoff procedure to be performed in advance may be performed in the same or corresponding manner as the post backoff procedure of the above-described embodiments. If the backoff counter of the backoff procedure expires before the transmission timing arrives, the STA is in a transmission standby state. The STA performs a CCA for a predetermined time immediately before the transmission timing, and transmits uplink data when the channel is idle. According to an embodiment, the predetermined time may be an AIFS, but the present invention is not limited thereto. When the transmission of uplink data based on the transmission timing is completed, the STA may perform the backoff procedure described above again.

On the other hand, if the backoff procedure is not completed before the transmission timing arrives, the STA delays the transmission of uplink data until the backoff counter of the backoff procedure expires. That is, the STA transmits uplink data when the backoff counter of the corresponding backoff procedure expires. Therefore, the uplink data transmission start time of a STA in which the backoff procedure is not completed may be delayed from the predetermined transmission timing.

Referring to the embodiment of FIG. 12(a), the uplink grant message 50 may indicate information of STAs to transmit uplink data at each transmission timing. STA1 and STA2, which are indicated to transmit at the first transmission timing (e.g., UL Time 1), respectively perform a backoff procedure before the first transmission timing (e.g., UL Time 1) arrives. In the embodiment of FIG. 12(a), the backoff procedures of STA1 and STA2 are completed before the first transmission timing (e.g., UL Time 1). STA1 and STA2 perform a CCA for an AIFS time before the first transmission timing (e.g., UL Time 1), and respectively transmit uplink data since the channel is idle. After transmission of the uplink data, STA1 and STA2 respectively perform a backoff procedure based on a new backoff counter allocated thereto.

At the second transmission timing (e.g., UL Time 2), uplink data transmission of STA1 is indicated. In the embodiment of FIG. 12(a), the backoff procedure of the STA1 is completed before the second transmission timing (e.g., UL Time 2), and the STA1 performs a CCA for an AIFS time before the second transmission timing (e.g., UL Time 2). Since the channel is idle for an AIFS time, the STA1 transmits uplink data. At the third transmission timing (e.g., UL Time 3), uplink data transmission of STA2 is indicated. STA2 transmits uplink data after a CCA for an AIFS time before the third transmission timing (e.g., UL Time 3) since the STA2 has already completed the prior backoff procedure and is in the transmission standby state.

Referring to the embodiment of FIG. 12(b), the channel is busy during the backoff procedure of STA1 before the first transmission timing (e.g., UL Time 1). STA1 suspends the backoff procedure and resumes the backoff procedure after an AIFS time when the channel is idle. However, the backoff procedure of STA1 is not completed before the first transmission timing (e.g., UL Time 1) arrives. Therefore, the STA1 delays the transmission of uplink data until the backoff counter of the backoff procedure expires. When the backoff counter of the backoff procedure expires, the STA1 may transmit the uplink data. According to an exemplary embodiment, the STA1 may determine whether to transmit uplink data considering the size of the data to be transmitted and the delayed time. That is, if the transmission period of the uplink data to be transmitted exceeds the next transmission timing due to the delayed time, the transmission of the uplink data may not be performed.

At the second transmission timing (e.g., UL Time 2), uplink data transmission of STA1 is indicated. In the embodiment of FIG. 12(b), the backoff procedure of the STA1 is completed before the second transmission timing (e.g., UL Time 2). However, the channel is busy during the CCA interval for an AIFS time and the STA1 fails to transmit uplink data. STA1 that fails to transmit uplink data performs a backoff procedure based on a new backoff counter an AIFS time after the channel becomes idle. At the third transmission timing (e.g., UL Time 3), uplink data transmissions of STA1 and STA2 are indicated. Since the prior backoff procedures of STA1 and STA2 have already been completed, STA1 and STA2 transmit uplink data after a CCA for an AIFS time before the third transmission timing (e.g., UL Time 3).

Figure 13:
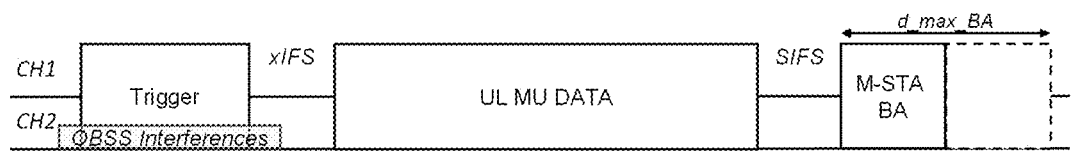
FIG. 13 illustrates an uplink multi-user transmission process according to the embodiment of the present invention.

FIG. 13 illustrates an uplink multi-user transmission process according to the embodiment of the present invention. As described above, the UL-MU transmission may be performed in response to a trigger frame transmitted by the AP. STAs simultaneously transmit uplink data an xIFS time after receiving the trigger frame. According to an embodiment, the xIFS may be a SIFS. When the AP transmits the trigger frame, a plurality of STAs transmit uplink data through the respective assigned subcarriers at the time designated by the trigger frame. The AP transmits an M-STA BA to STAs that have succeeded in the uplink data transmission a SIFS time after the uplink data transmission is completed. The length of the M-STA BA may vary depending on the number of target STAs of the ACK information. According to an embodiment, the length of the M-STA BA may be determined within a maximum BA length (e.g., d_max_B A).

In the UL-MU transmission process, the transmission performance may vary depending on the format of the trigger frame. To determine the format of the trigger frame, the following factors need to be considered. First, signaling efficiency should be considered. In other words, it should be considered how small packet overhead is possible to transmit the trigger frame. Next, the decoding performance of the trigger frame should be considered. That is, it should be able to receive the trigger frame reliably even in the interference of other BSS (OBSS) or an outdoor environment. Next, the reception of uplink multi-user data of the AP should be protected from hidden nodes adjacent to the AP. In addition, the reception of downlink M-STA BA of each uplink STA should be protected from hidden nodes adjacent to the corresponding STA. In this case, since the length of the M-STA BA is variable, protection should be performed up to the maximum BA length (e.g., d_max_BA).

According to the embodiment of the present invention, various types of trigger frames are proposed. According to an embodiment, a trigger frame of null data packet (NDP) format may be used. The NDP is a packet format that contains only a PHY header and does not contain a MAC frame. According to another embodiment, a trigger frame of MAC format may be used. In this case, the trigger frame of the MAC format may be transmitted in various PPDU formats of a legacy wireless LAN system (e.g., 802.11a, n, ac) and/or a non-legacy wireless LAN system (e.g., 802.11ax).

Hereinafter, embodiments of the present invention will be described under the following assumptions. However, at least some of the assumptions may be changed or omitted according to an embodiment.

First, the performance of the trigger frame can be supplemented by additional message exchange such as RTS/CTS before the transmission of the trigger frame. According to an embodiment of the present invention, the UL-MU transmission process may be controlled through a trigger frame without an additional RTS/CTS transmission sequence. According to another embodiment of the present invention, the UL-MU transmission process may be controlled with the aid of an additional RTS/CTS transmission sequence.

Second, legacy STAs may identify the received non-legacy PPDU (i.e., HE PPDU) as an 802.11a PPDU based on the legacy preamble of that PPDU and attempt to decoding process of the MAC frame. However, in the decoding process, a frame check sequence (FCS) error of the MAC frame occurs. Therefore, the legacy STAs further waits for an extended IFS (EIFS) interval after the time indicated by an L-SIG of the legacy preamble of the corresponding PPDU and performs a backoff procedure to attempt channel access.

Third, the length of the non-legacy PPDU may be indicated by a combination of a Length field and a Rate field included in the L-SIG or the repeated L-SIG of the corresponding PPDU.

Fourth, regarding to the non-legacy PPDU, a transmission suitable for an outdoor environment can be performed by repeating some preamble symbols or transmitting with an extended length of an OFDM cyclic prefix (CP).

Figure 14:
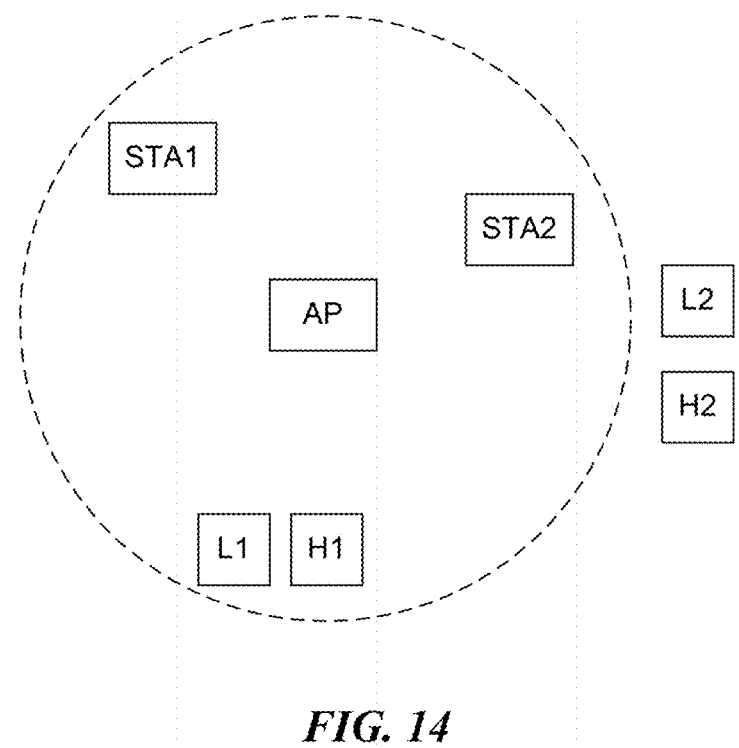
FIG. 14 illustrates an embodiment of a placement situation of terminals around a specific BSS.

FIG. 14 illustrates an embodiment of a placement situation of terminals around a specific BSS. In the embodiment of FIG. 14, the AP communicates with STA1 and STA2, and hidden nodes L1, H1, L2 and H2 exist on the basis of a specific terminal. Here, L1 and L2 denote legacy STAs, respectively, and H1 and H2 denote non-legacy STAs, respectively.

L1 and H1 are capable of sensing messages of the AP, but cannot receive messages of STA1 and STA2. Thus, L1 and H1 may interfere with the AP when the AP receives messages from STA1 and STA2. On the other hand, L2 and H2 are capable of sensing messages of STA2, but cannot receive messages of the AP. Thus, L2 and H2 may interfere with STA2 when STA2 receives a message from the AP. Hereinafter, the embodiments of FIGS. 15 to 17 will be described on the assumption of the placement of terminals in FIG. 14.

Figure 15:
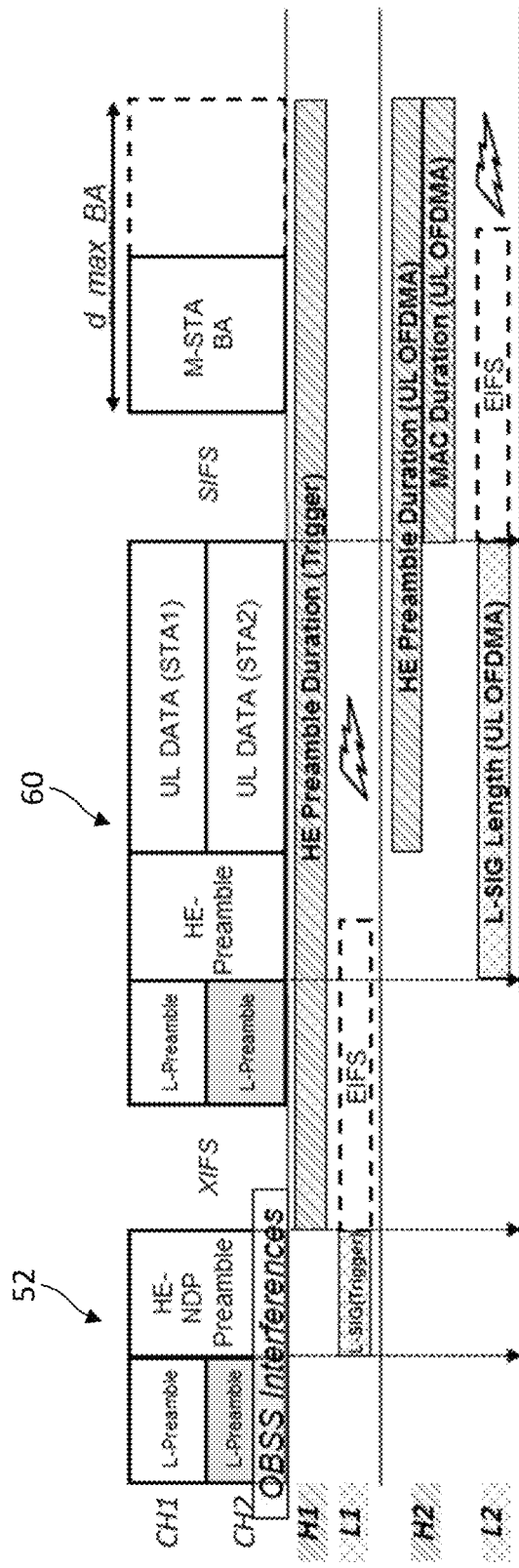
FIG. 15 illustrates an uplink multi-user transmission process according to an embodiment of the present invention and operations of hidden nodes according to the process.
Figure 16:
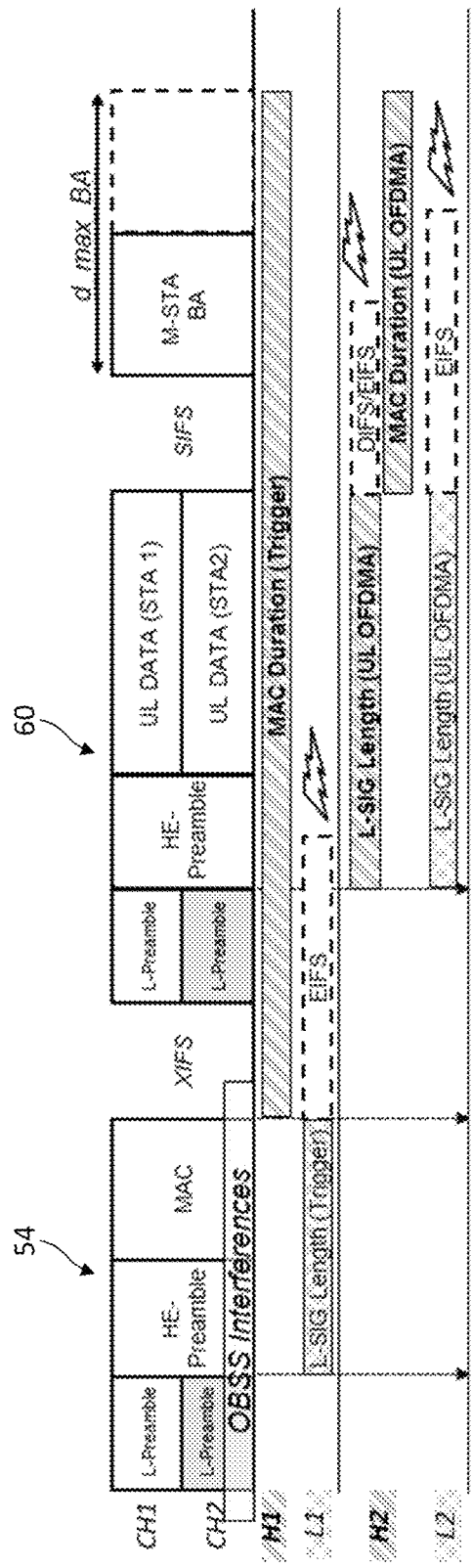
FIG. 16 illustrates an uplink multi-user transmission process according to another embodiment of the present invention and operations of hidden nodes according to the process.
Figure 17:
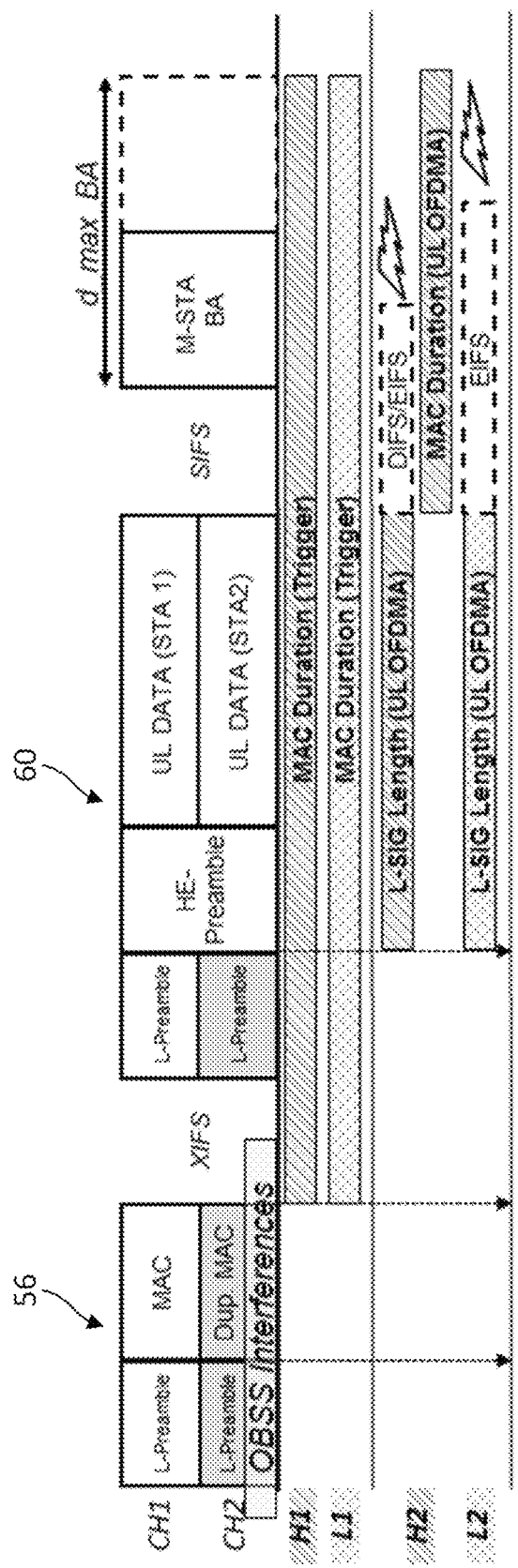
FIG. 17 illustrates an uplink multi-user transmission process according to yet another embodiment of the present invention and operations of hidden nodes according to the process.

FIGS. 15 to 17 illustrate various embodiments of an uplink multi-user transmission process and operations of hidden nodes according to the process. In the embodiment of FIGS. 15 to 17, the UL-MU transmission process is performed through a 40 MHz band including CH1 and CH2. When a trigger frame for the initiation of the UL-MU transmission process is transmitted, an interference of the OBSS occurs to the CH2. In each embodiments shown in FIGS. 15 to 17, duplicative description of parts which are the same as or corresponding to the previous embodiment will be omitted.

FIG. 15 illustrates an uplink multi-user transmission process according to an embodiment of the present invention and operations of hidden nodes according to the process. According to the embodiment of FIG. 15, a trigger frame 52 in the NDP format is used for the UL-MU transmission process.

The NDP trigger frame 52 includes a legacy preamble (i.e., L-Preamble) and a non-legacy NDP preamble (i.e., HE-NDP Preamble). The legacy preamble includes a legacy short training field (L-STF), a legacy long training field (L-LTF) and a legacy signal field (L-SIG). In addition, the non-legacy NDP preamble includes a repeated L-SIG (RL-SIG), a high efficiency signal field A (HE-SIG-A), and a high efficiency signal field B (HE-SIG-B).

When the NDP trigger frame 52 is transmitted through a multi-channel, the legacy preamble portion of the NDP trigger frame 52 may be transmitted in duplicate in units of 20 MHz channels. The non-legacy NDP preamble is transmitted after the legacy preamble. The non-legacy NDP preamble is transmitted via a 64 FFT-based signal. According to an embodiment, a 256-FFT based high efficiency short training field (HE-STF) and a high efficiency long training field (HE-LTF) may be omitted from the non-legacy NDP preamble.

The NDP trigger frame 52 includes information indicating that the corresponding frame is a trigger frame. According to an embodiment, the information indicating a trigger frame may be represented by a predetermined field of any one of L-SIG of the legacy preamble, and RL-SIG, HE-SIG-A or HE-SIG-B of the non-legacy NDP preamble. According to another embodiment, the information indicating a trigger frame may be represented by a reserved bit field or an unused subcarrier of the legacy preamble. According to yet another embodiment, the information indicating that the corresponding frame is a trigger frame may be represented through phase rotation of symbols, transmission of an orthogonal sequence, or the like.

The NDP trigger frame 52 may be robustly received in an outdoor environment. However, when OBSS interference occurs in CH2 as shown in FIG. 15, it may be difficult for STAs to receive the NDP trigger frame 52. Accordingly, the AP may robustly transmit the HE-SIG-B of the NDP trigger frame 52. According to an embodiment, the HE-SIG-B may be transmitted in duplicate in units of 20 MHz channels. According to another embodiment, the HE-SIG-B may be transmitted with a predetermined robust modulation and coding scheme (MCS). According to yet another embodiment, the HE-SIG-B may be transmitted on a 20 MHz channel basis and only represent resource information of STAs allocated to the corresponding channel for each 20 MHz channel. According to still another embodiment, when the HE-SIG-B comprises a plurality of symbols, the MCS may be set differently for each symbol. According to still yet another embodiment, a cyclic redundancy check (CRC) code may be transmitted for each 20 MHz channel through which the NDP trigger frame 52 is transmitted so that the HE-SIG-B can be analyzed for each channel.

STAs receiving the NDP trigger frame 52 simultaneously transmit an uplink PPDU 60 after an xIFS time. According to an embodiment, the xIFS may be a SIFS. The uplink multi-user PPDU (UL-MU PPDU) 60 transmitted by a plurality of STAs includes a legacy preamble (i.e., L-Preamble) and a non-legacy preamble (i.e., HE-Preamble). The legacy preamble includes L-STF, L-LTF and L-SIG. In addition, the non-legacy preamble includes RL-SIG, HE-SIG-A, HE-STF and HE-LTF. According to an embodiment, HE-SIG-B indicating information for individual STAs may be omitted from the trigger frame-based UL-MU PPDU 60.

The AP transmits an M-STA BA to STAs that have succeeded in the uplink data transmission a SIFS time after the transmission of the UL-MU PPDU 60 is completed. The length of the M-STA BA may vary depending on the number of target STAs of the ACK information. According to an embodiment, the length of the M-STA BA may be determined within a maximum BA length (e.g., d_max_BA).

According to the embodiment of the present invention, the preamble of the non-legacy packet transmitted by the AP and the STA may contain remaining time information of the current transmission opportunity (TXOP). More specifically, the non-legacy preamble of the NDP trigger frame 52 and the UL-MU PPDU 60 transmitted in the UL-MU transmission process contains information of the remaining TXOP time of the current TXOP. The remaining TXOP time information may indicate the remaining time until the completion of the M-STA BA transmission of the corresponding UL-MU transmission process. As described above, when the length of M-STA BA is variable, the remaining TXOP time information may be set based on the maximum BA length (e.g., d_max_BA). When a plurality of UL-MU transmission processes are performed in the same TXOP as in the following embodiments, the remaining TXOP time information may indicate the time until the completion of the last UL-MU transmission process.

According to the embodiment of the present invention, the remaining TXOP time information may be represented by a predetermined TXOP duration field of the HE-SIG-A of the non-legacy preamble. According to an embodiment, the TXOP duration field of the HE-SIG-A may consist of fewer bits than a TXOP field of a MAC header of the corresponding packet. Therefore, the TXOP duration field of the HE-SIG-A may indicate TXOP time information in a predetermined unit, for example, an OFDM symbol unit. According to another embodiment of the present invention, the remaining TXOP time information may be represented by a combination of a legacy preamble and a non-legacy preamble. According to an embodiment, the remaining TXOP time information may be represented by a combination of a Length field and a Rate field of the L-SIG, and a predetermined field of the HE-SIG-A. For example, when the remaining TXOP time is set to an integer times of Length field information of the L-SIG, the predetermined field of the HE-SIG-A may indicate information of the integer scaling factor.

The UL-MU transmission non-participating terminals that have received at least one of the NDP trigger frame 52 and the UL-MU PPDU 60 set a network allocation vector (NAV) based on the remaining TXOP time information. By inserting the TXOP information into the preamble of the packet, the terminals may obtain the TXOP information and set the NAV earlier than when the TXOP information is inserted into the conventional MAC header.

Referring to the embodiment of FIG. 14, the terminals L1 and H1 receive the NDP trigger frame 52 transmitted by the AP. In addition, the terminals L2 and H2 receive the UL-MU PPDU 60 transmitted by the STA2. The operations of the neighboring terminals L1, H1, L2 and H2 in the UL-MU transmission process of FIG. 15 are as follows.

First, the non-legacy terminal H1 receiving the NDP trigger frame 52 obtains the remaining TXOP time information included in the non-legacy preamble of the corresponding packet, and sets a NAV based thereon.

Meanwhile, the legacy terminal L1 receiving the NDP trigger frame 52 estimates a length of the packet based on the Length field of the L-SIG of the corresponding packet. The terminal L1 identifies the NDP trigger frame 52 as an 802.11a packet and performs an FCS check. However, the terminal L1 accesses the channel after an EIFS time due to an error. However, if the Length field of the L-SIG indicates the length of only the corresponding packet 52, a collision may occur when the AP receives the UL-MU PPDU 60 due to the channel access of the terminal L1. According to the embodiment of the present invention, in order to prevent such collision, the Length field of the L-SIG of the NDP trigger frame 52 may be set based on the TXOP information of the corresponding packet. That is, the Length field of the L-SIG of the NDP trigger frame 52 may be set based on the remaining time until the completion of the M-STA BA transmission of the corresponding UL-MU transmission process. Accordingly, the terminal L1 receiving the NDP trigger frame 52 may set a NAV for the corresponding TXOP duration based on the Length field of the L-SIG and delay the transmission.

The non-legacy terminal H2 receiving the UL-MU PPDU 60 obtains the remaining TXOP time information contained in the non-legacy preamble of the corresponding packet and sets a NAV based thereon. Meanwhile, according to another embodiment of the present invention, the terminal H2 may set the NAV by additionally using duration field information of a MAC header of the UL-MU PPDU 60. In this case, since the UL-MU PPDU 60 is transmitted using MIMO or OFDMA, it may be difficult for neighboring terminals to overhear only the corresponding packet and decode the MAC header. Accordingly, the terminal H2 may decode the MAC header of the UL-MU PPDU 60 by referring to at least one of information extracted from the NDP trigger frame 52 and information extracted from the HE-SIG-A of the UL-MU PPDU 60. The terminal H2 may set a NAV based on information of at least one duration field among the decoded multi-user MAC header information.

The legacy terminal L2 receiving the UL-MU PPDU 60 estimates a length of the packet based on the Length field of the L-SIG of the corresponding packet. The terminal L2 identifies the UL-MU PPDU 60 as an 802.11a packet and performs an FCS check. However, the terminal L2 accesses the channel after an EIFS time due to an error. However, if the Length field of the L-SIG indicates the length of only the corresponding packet 60, a collision may occur when the STA2 receives the M-STA BA due to the channel access of the terminal L2. Therefore, according to the embodiment of the present invention, the Length field of the L-SIG of the UL-MU PPDU 60 may be set based on the TXOP information of the corresponding packet. That is, the Length field of the L-SIG of the UL-MU PPDU 60 may be set based on the remaining time until the completion of the M-STA BA transmission of the corresponding UL-MU transmission process.

FIG. 16 illustrates an uplink multi-user transmission process according to another embodiment of the present invention and operations of hidden nodes according to the process. According to the embodiment of FIG. 16, a non-legacy PPDU (i.e., HE PPDU) trigger frame 54 is used for the UL-MU transmission process.

The HE PPDU trigger frame 54 includes a legacy preamble (i.e., L-Preamble), a non-legacy preamble (i.e., HE-Preamble), and MAC data. The legacy preamble includes L-STF, L-LTF and L-SIG. Also, the non-legacy preamble includes RL-SIG, HE-SIG-A, HE-SIG-B, HE-STF and HE-LTF. In this case, the RL-SIG, HE-SIG-A and HE-SIG-B are transmitted via a 64 FFT-based signal. On the other hand, the HE-STF and HE-LTF are transmitted via a 256 FFT-based signal. The MAC data includes a MAC header and a MAC service data unit (MSDU).

The AP may use the methods described above in FIG. 15 to robustly transmit the HE PPDU trigger frame 54. In addition, the AP may transmit the MAC data of the HE PPDU trigger frame 54 in OFDMA form in order to avoid collisions due to OBSS interference in some channels. That is, the MAC data of the HE PPDU trigger frame 54 may be transmitted in duplicate in units of a channel or a subchannel to improve the reception probability.

STAs receiving the HE PPDU trigger frame 54 simultaneously transmit an uplink PPDU 60 after an xIFS time. The configuration of the uplink multi-user PPDU 60 based on the trigger frame is as described above in FIG. 15. The AP transmits an M-STA BA to STAs that have succeeded in the uplink data transmission a SIFS time after the transmission of the UL-MU PPDU 60 is completed. As described above, the length of the M-STA BA may vary depending on the number of target STAs of the ACK information within the maximum BA length (e.g., d_max_BA).

As described above with reference to FIG. 15, the remaining time information of the current TXOP may be contained in the preamble of the non-legacy packet transmitted by the AP and the STA. That is, the non-legacy preamble of the HE PPDU trigger frame 54 and the UL-MU PPDU 60 transmitted in the UL-MU transmission process contains information of the remaining TXOP time of the current TXOP. A specific method of indicating the remaining TXOP time information in the HE PPDU trigger frame 54 is as described above with reference to FIG. 15. The UL-MU transmission non-participating terminals that have received at least one of the HE PPDU trigger frame 54 and the UL-MU PPDU 60 set a NAV based on the remaining TXOP time information.

The operations of the neighboring terminals L1, H1, L2 and H2 in the UL-MU transmission process of FIG. 16 are as follows. First, the non-legacy terminal H1 receives the HE PPDU trigger frame 54 transmitted by the AP. According to an embodiment, the terminal H1 may set a NAV based on duration field information of a MAC header of the HE PPDU trigger frame 54. The duration field of the MAC header of the HE PPDU trigger frame 54 indicates a period up to the completion of the M-STA BA transmission in the corresponding UL-MU transmission process. According to the embodiment of the present invention, the terminal H1 may obtain the remaining TXOP time information contained in the non-legacy preamble of the HE PPDU trigger frame 54 and set the NAV based thereon. Therefore, the non-legacy terminals receiving the HE PPDU trigger frame 54 can set a NAV based on the information of the non-legacy preamble even in a situation where decoding of the MAC header of the corresponding packet is unavailable.

Next, the non-legacy terminal H2 receives the UL-MU PPDU 60 transmitted by the STA2. According to an embodiment, the terminal H2 obtains the remaining TXOP time information contained in the non-legacy preamble of the corresponding packet and sets a NAV based thereon. According to another embodiment of the present invention, the terminal H2 may set the NAV by additionally using duration field information of a MAC header of the UL-MU PPDU 60.

According to yet another embodiment of the present invention, the terminal H2 may delay the transmission based on the Length field of the L-SIG of the UL-MU PPDU 60 and attempt transmission after a DIFS or an EIFS. If the received packet is a data packet, the terminal should further wait at least for an EIFS time after a time point based on the Length field. However, if the received packet is an ACK packet, the terminal may further wait for a DIFS time after the time point based on the Length field. Accordingly, the terminal needs to distinguish whether the received packet is a data packet or an ACK packet.

If the received packet is an HE single user (SU) PPDU, the terminal H2 can decode the MAC frame of the corresponding packet. Furthermore, if the received packet is an HE DL-MU PPDU, the terminal H2 can decode the MAC frame using information extracted from HE-SIG-A and/or HE-SIG-B of the corresponding packet. Accordingly, in the above cases, the terminal H2 can distinguish whether the packet is a data packet or an ACK packet. However, if the received packet is an HE UL-MU PPDU, the terminal H2 may have difficulty in decoding the MAC header of the corresponding packet without information extracted from the trigger frame 54. Therefore, according to a further embodiment of the present invention, an indicator for distinguishing whether the packet is a data packet or an ACK packet may be contained in a legacy preamble or a non-legacy preamble of the non-legacy packet.

According to an embodiment, the indicator for distinguishing the data/ACK may be represented by a reserved bit field or an unused subcarrier of the legacy preamble. According to another embodiment, the indicator for distinguishing the data/ACK may be represented by a phase rotation, orthogonal sequence of RL-SIG symbols. According to yet another embodiment, the indicator for distinguishing the data/ACK may be represented by a combination of modulation schemes applied to two symbols of the HE-SIG-A. According to a further embodiment of the present invention, if it is impossible to distinguish whether the received packet is a data packet or an ACK packet, the terminal H2 further waits at least for an EIFS time after a time point based on the Length field.

Meanwhile, the operations of the legacy terminal L1 that received the HE PPDU trigger frame 54 and the legacy terminal L2 that received the UL-MU PPDU 60 in the embodiment of FIG. 16 are as described above in FIG. 15.

FIG. 17 illustrates an uplink multi-user transmission process according to yet another embodiment of the present invention and operations of hidden nodes according to the process. According to the embodiment of FIG. 17, a legacy format trigger frame 56 is used for the UL-MU transmission process. According to an embodiment, the legacy format trigger frame 56 may be configured as a PPDU in 802.11a format.

The legacy format trigger frame 56 includes a legacy preamble (i.e., L-Preamble) and MAC data. The legacy preamble includes L-STF, L-LTF and L-SIG. The trigger information of the legacy format trigger frame 56 may be transmitted via the MAC data of the corresponding frame. When the legacy format trigger frame 56 is transmitted through multiple channels, the legacy preamble portion of the trigger frame 56 is transmitted in duplicate in units of 20 MHz channels. Moreover, since the maximum transmission bandwidth of a PPDU of the 802.11a format is 20 MHz, the MAC data of the legacy format trigger frame 56 may also be transmitted on a 20 MHz channel basis. According to an embodiment, the MAC data of the legacy format trigger frame 56 transmitted on a 20 MHz channel basis may represent the same information in duplicate. According to another embodiment of the present invention, in order to shorten the total length of the trigger frame, the MAC data of the legacy format trigger frame 56 may contain different information for each channel.

STAs receiving the non-legacy format trigger frame 56 simultaneously transmit an uplink PPDU 60 after an xIFS time. The configuration of the uplink multi-user PPDU 60 based on the trigger frame is as described above in FIG. 15. The AP transmits an M-STA BA to STAs that have succeeded in the uplink data transmission a SIFS time after the transmission of the UL-MU PPDU 60 is completed. As described above, the length of the M-STA BA may vary depending on the number of target STAs of the ACK information within the maximum BA length (e.g., d_max_BA).

The operations of the neighboring terminals L1, H1, L2 and H2 in the UL-MU transmission process of FIG. 17 are as follows. First, the non-legacy terminal H1 receives the legacy format trigger frame 56 transmitted by the AP. According to an embodiment, the terminal H1 may set a NAV based on duration field information of a MAC header of the legacy format trigger frame 56. The duration field of the MAC header of the legacy format trigger frame 56 indicates a period up to the completion of the M-STA BA transmission in the corresponding UL-MU transmission process. According to another embodiment, the L-SIG of the legacy format trigger frame 56 may contain the above-described TXOP duration field in preparation for the case that neighboring non-legacy terminals cannot decode the MAC header due to robust reception or the like. The terminal H1 may set a NAV based on the TXOP duration field of the L-SIG. According to yet another embodiment, the terminal H1 may set a NAV by combining a length obtained in combination of the Length field and the Rate field of the L-SIG of the legacy format trigger frame 56 with a length obtained based on the duration field of the MAC header.

Next, the legacy terminal L1 receives the legacy format trigger frame 56 transmitted by the AP. According to an embodiment, the terminal L1 may set a NAV based on the duration field information of the MAC header of the legacy format trigger frame 56. According to another embodiment, the TXOP duration field may be contained in the L-SIG of the legacy format trigger frame 56 as described above. In this case, the terminal L1 may set the NAV based on the TXOP duration field of the L-SIG.

Meanwhile, the operations of the non-legacy terminal H2 and the legacy terminal L2, which have received the UL-MU PPDU 60 in the embodiment of FIG. 17, are as described above in FIGS. 15 and 16.

Figure 18:
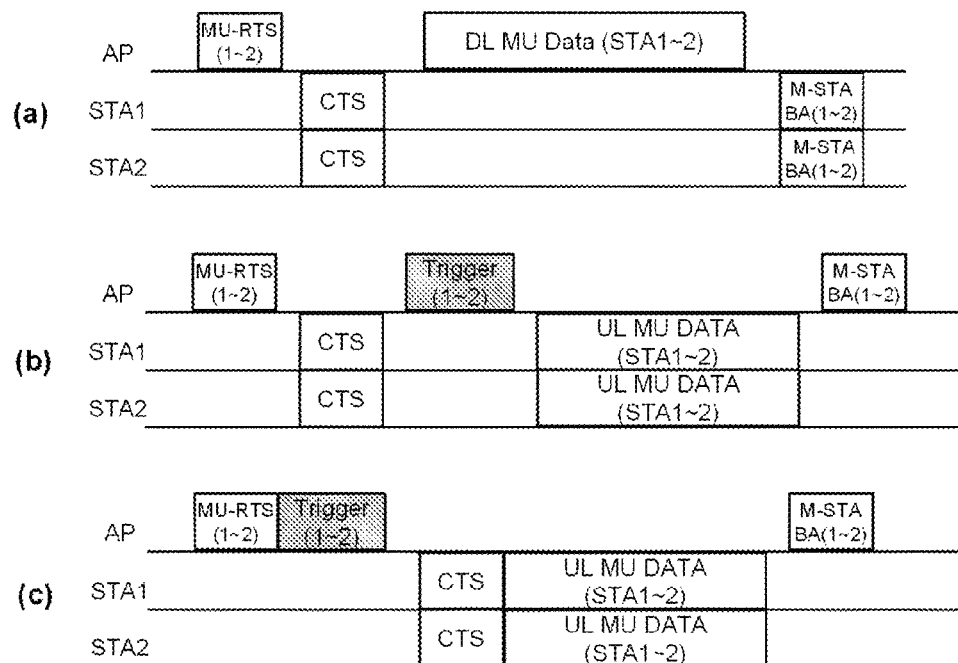
FIG. 18 illustrates a hidden node protection method in a multi-user transmission process.

FIG. 18 illustrates a hidden node protection method in a multi-user transmission process. In the uplink/downlink multi-user transmission process, NAV setting of UEs not participating in data transmission is required. In particular, when multi-user transmission is performed on a subchannel basis, there is a need for a method that enables legacy terminals that cannot receive subchannel data to correctly set the NAV.

A multi-user RTS (MU-RTS) may be transmitted for data transmission protection in a multi-user transmission process. The MU-RTS designates a plurality of receivers via a plurality of receiver address fields. The receivers receiving the MU-RTS simultaneously transmit CTSs after a SIFS. In this case, the CTSs simultaneously transmitted by a plurality of receivers have the same waveform. According to an exemplary embodiment, any one of the same MCS as the MU-RTS, a basic MCS of the corresponding BSS, or an MCS specified by the MU-RTS may be applied to the CTS. Also, the same sequence as the MU-RTS is used for the initial sequence applied to the scrambling technique. In the 1-to-n communication process between the AP and the plurality of STAs, the neighboring terminals set a NAV based on the duration field value of the MAC header of the MU-RTS and the CTS corresponding thereto.

FIG. 18(a) shows a hidden node protection method in the DL-MU transmission process. First, the AP transmits an MU-RTS for NAV setting in the DL-MU transmission process. The duration field of the MU-RTS is set to a period up to the end of the DL-MU transmission process. That is, the duration field of the MU-RTS frame is set based on a period until the downlink data transmission of the AP and the ACK transmissions of the STAs are completed. The neighboring terminals of the AP set a NAV until the end of the DL-MU transmission process based on the duration field of the MU-RTS transmitted by the AP. In the embodiment of FIG. 18(a), STA1 and STA2 are designated as receivers of the MU-RTS. The receiver of the MU-RTS may indicate the receiver of the DL-MU transmission process.

The receivers receiving the MU-RTS from the AP, that is, STA1 and STA2 simultaneously transmit the CTS. The simultaneous CTS transmitted by a plurality of STAs have the same waveform. The duration field of the simultaneous CTS is set to a period up to the end of the DL-MU transmission process based on the information of the duration field of the MU-RTS. That is, the duration field of the simultaneous CTS is set based on the period until the downlink data transmission of the AP and the ACK transmission of the STAs are completed. In FIG. 18(a), the neighboring terminals of STA1 and STA2 set a NAV until the end of the DL-MU transmission process based on the duration field of the CTS.

According to an embodiment of the present invention, the MU-RTS and the simultaneous CTS may be transmitted on a 20 MHz channel basis. Therefore, the neighboring terminals including the legacy terminals can receive the MU-RTS and/or the simultaneous CTS and set a NAV. The AP transmits DL-MU data when receiving the CTS from at least one of STA1 and STA2, which are receivers of the MU-RTS. In other words, the AP transmits DL-MU data to STA1 and STA2, respectively. The STAs receive the DL-MU data transmitted by the AP and transmit a multiplexed ACK, i.e., M-STA BA in response thereto.

FIG. 18(b) shows an embodiment of a hidden node protection method in the UL-MU transmission process. According to the embodiment of the present invention, a protection method similar to the DL-MU transmission process described above may be used in the UL-MU transmission process.

First, the AP transmits an MU-RTS for NAV setting in the UL-MU transmission process. The duration field of the MU-RTS is set to a period up to the end of the UL-MU transmission process. That is, the duration field of the MU-RTS frame is set based on a period until the uplink data transmissions of the STAs and the M-STA BA transmission of the AP are completed. The neighboring terminals of the AP set a NAV until the end of the DL-MU transmission process based on the duration field of the MU-RTS transmitted by the AP. In the embodiment of FIG. 18(b), STA1 and STA2 are designated as receivers of the MU-RTS. The receiver of the MU-RTS may indicate the transmitter of the UL-MU transmission process.

The receivers receiving the MU-RTS from the AP, that is, STA1 and STA2 simultaneously transmit the CTS. The duration field of the simultaneous CTS is set to a period up to the end of the UL-MU transmission process based on the information of the duration field of the MU-RTS. That is, the duration field of the simultaneous CTS is set based on the period until the uplink data transmissions of the STAs and the M-STA BA transmission of the AP are completed. In FIG. 18(b), the neighboring terminals of STA1 and STA2 set a NAV until the end of the UL-MU transmission process based on the duration field of the CTS.

The AP transmits a trigger frame when receiving the CTS from at least one of STA1 and STA2, which are receivers of the MU-RTS. The trigger frame may contain resource allocation information for STA1 and STA2, which are receivers of the MU-RTS. The STAs receive the trigger frame transmitted by the AP and transmit uplink multi-user data in response thereto. The AP receives the uplink multi-user data transmitted by the STAs and transmits an M-STA BA in response thereto.

FIG. 18(c) shows another embodiment of a hidden node protection method in the UL-MU transmission process. According to another embodiment of the present invention, the AP may transmit a frame in which the MU-RTS and the trigger information are aggregated. For example, the AP may transmit an MU-RTS configured in a format of a trigger frame. The AP may indicate that the corresponding frame is an MU-RTS frame through a predetermined field of the trigger frame. The predetermined field is a field indicating the type of the trigger frame.

STAs receiving the MU-RTS in a trigger frame format from the AP transmit uplink multi-user data in response thereto. The uplink multi-user data transmitted by the STAs may contain the simultaneous CTS information described above. In this manner, the MU-RTS and the trigger frame are aggregated and transmitted, and the CTS and the uplink multi-user data are aggregated and transmitted, so that the overall time required for the UL-MU transmission process can be shortened.

Figure 19:
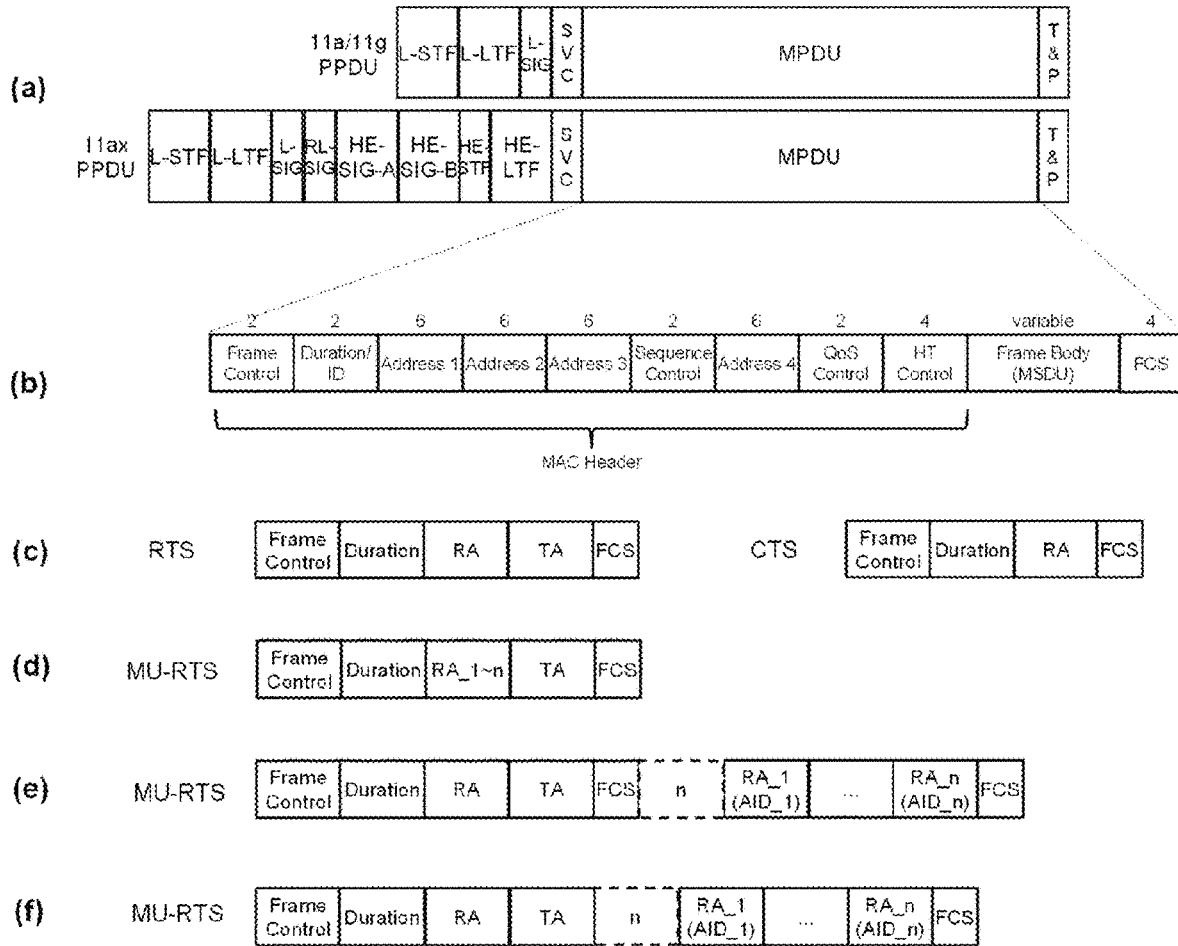
FIG. 19 illustrates various embodiments of an MPDU format of an MU-RTS.

FIG. 19 illustrates various embodiments of an MPDU format of an MU-RTS.

First, FIG. 19(a) shows a comparison of formats of a legacy PPDU, that is, an 802.11a/g PPDU and a non-legacy PPDU, that is, an 802.11ax PPDU. As illustrated, the PPDU consist of a PHY preamble and a MAC Protocol Data Unit (MPDU). As described above, the PHY preamble of the legacy PPDU includes the legacy preamble, i.e., L-STF, L-LTF, and L-SIG. In addition, the PHY preamble of the non-legacy PPDU further includes the non-legacy preamble in addition to the legacy preamble.

FIG. 19(b) shows an embodiment of a configuration of an MPDU. As illustrated, the MPDU includes a frame control field, a duration/ID field, address fields (e.g., Address 1 to 3, Address 4), a sequence control field, a QoS control field, an HT control field and a MAC Service Data Unit (MSDU). The MSDU is determined to have a variable length, and the end of the MPDU includes an FCS for error checking. The frame control field includes a type field and a subtype field. The type field indicates either a control frame, a management frame or a data frame, and the subtype field indicates either an RTS, a CTS, an ACK or a BA when the type field is indicated as a control frame. The duration/ID field indicates a value for NAV setting of terminals.

FIG. 19(c) shows an MPDU configuration of an RTS and a CTS among the control frames. In the frame control field of the RTS, the type field value is indicated as a control frame and the subtype field value is indicated as an RTS, respectively. The duration field indicates length information for NAV setting. RA indicates a MAC address of the receiver of the RTS, and TA indicates a MAC address of the transmitter of the RTS. According to an embodiment, the RTS may only be transmitted with fixed fields and length.

The terminal receiving the RTS transmits a CTS when the RA value of the RTS matches the MAC address of the corresponding terminal. If the RA value does not match the MAC address of the corresponding terminal, the terminal checks an FCS after 2+2+6+6=16 bytes. If the FCS check is successful, the terminal sets a NAV based on the duration field of the RTS. However, if the FCS check fails, the terminal may access the channel again an EIFS after the corresponding PPDU. When the terminal transmits the CTS, the RA of the CTS is determined as the TA value of the RTS. In addition, the duration field value of the CTS is determined by subtracting the length of the SIFS and the CTS from the duration field value of the RTS.

FIG. 19(d) shows a method of an MPDU configuration of an MU-RTS according to an embodiment of the present invention. In the frame control field of the MU-RTS, the type field value is indicated as a control frame and the subtype field value is indicated as an RTS, respectively. In the RA field, a plurality of receiver addresses RA_1 to RA are represented in a partial AID (PAID) or a group ID (GID) format. In this case, the addresses of all the STAs participating in the multi-user transmission may not be fully represented, but sufficient NAV setting effect may occur when the CTS is transmitted from a certain number of STAs. According to an embodiment, particular information indicating that the corresponding MPDU is an MU-RTS may be additionally represented in a frame control field or a PHY preamble.

FIG. 19(e) shows a method of an MPDU configuration of an MU-RTS according to another embodiment of the present invention. In the frame control field of the MU-RTS, the type field value is indicated as a control frame and the subtype field value is indicated as an RTS, respectively. In case of legacy terminals, it is identified that the MPDU is terminated after an FCS of the conventional RTS. According to the embodiment of the present invention, n receiver addresses RA_1, . . . , RA_n may be further inserted into the MU-RTS after the FCS of the conventional RTS is terminated. In this case, the addresses of all the STAs participating in the multi-user transmission may be represented by the respective receiver addresses. According to an embodiment, an 'n' field may be further included to indicate the number of STAs participating in the multi-user transmission. However, according to another embodiment of the present invention, the 'n' field may be omitted when the number of STAs participating in the multi-user transmission can be inferred from length information of the PHY preamble. As described above, particular information indicating that the corresponding MPDU is an MU-RTS may be additionally represented in the frame control field or the PHY preamble. At the end of the MU-RTS, a separate FCS for the MU-RTS may be inserted.

FIG. 19(f) shows a method of an MPDU configuration of an MU-RTS according to yet another embodiment of the present invention. In the frame control field of the MU-RTS, the type field value is indicated as a control frame and the subtype field value is indicated as an MU-RTS, respectively. Also, n receiver addresses RA_1, . . . , RA_n may be further inserted into the MU-RTS as in the above embodiment. Since the legacy terminals cannot identify the MU-RTS subfield, the legacy terminals check an FCS corresponding to 4 bytes at the end of the corresponding MPDU and set a NAV based on the duration field value only when the FCS check is successful.

The embodiments of FIG. 19 illustrate an embodiment of the present invention configuring the MU-RTS, and the present invention is not limited thereto. As described above, the MU-RTS may also be configured in a trigger frame format.

Figure 20:
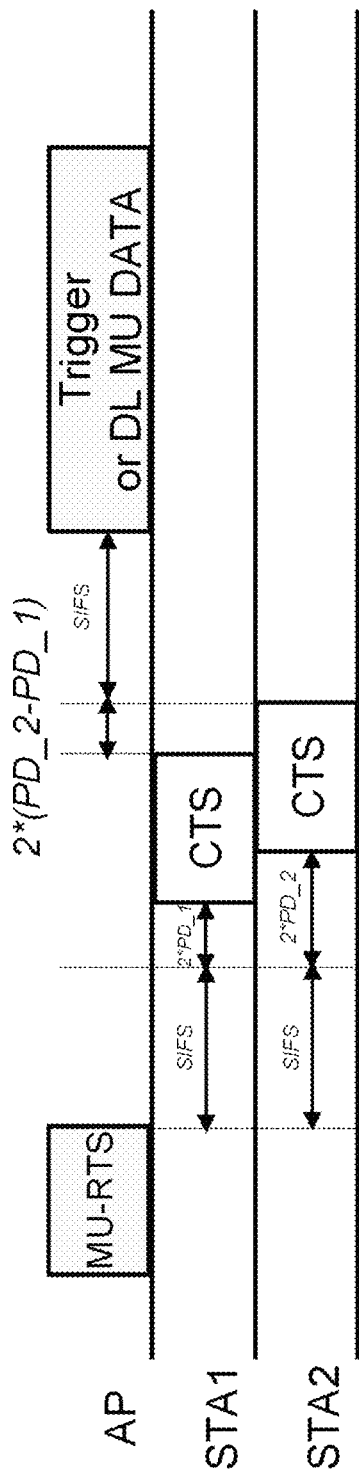
FIG. 20 illustrates a method of supporting data transmission/reception of an outdoor terminal using MU-RTS and CTS.

FIG. 20 illustrates a method of supporting data transmission/reception of an outdoor STA using MU-RTS and CTS. In the data transmission/reception of the outdoor STA located far away from the AP and located in the open space, the change of the channel delay time is significant. Therefore, for the outdoor STA, a separate configuration such as repetition of signaling information in the preamble portion and long CP usage in the data portion is required. In the embodiment of the present invention, a PPDU having such a separate configuration is referred to as a non-legacy outdoor PPDU.

According to the embodiment of the present invention, the outdoor STA may be identified through a transmission process of an MU-RTS and a CTS, and the non-legacy outdoor PPDU may be transmitted. The time it takes for the AP to transmit the MU-RTS and receive the corresponding CTS from the STA is SIFS+2*PD_n. Here, PD_n denotes the propagation delay time between an AP and a STA_n, and it is assumed that the time taken in both directions is the same. In this case, the outdoor STA among the STAs transmitting the CTS can be determined as follows.

First, when 2*PD_n is equal to or greater than a preset threshold value, the STA_n may be determined as an outdoor STA at a distance from the AP. Second, when the difference value of propagation delay time until the transmitted CTS has been reached by arbitrary STA_x and STA_y, that is, 2*(PD_x−PD_y) is equal to or greater than a preset threshold value, the STA having a larger propagation delay time may be determined as a door STA. According to another embodiment, a STA performing a response to a non-legacy outdoor PPDU may be determined as an outdoor STA. The AP transmits data to the determined outdoor STA via a non-legacy outdoor PPDU.

Figure 21:
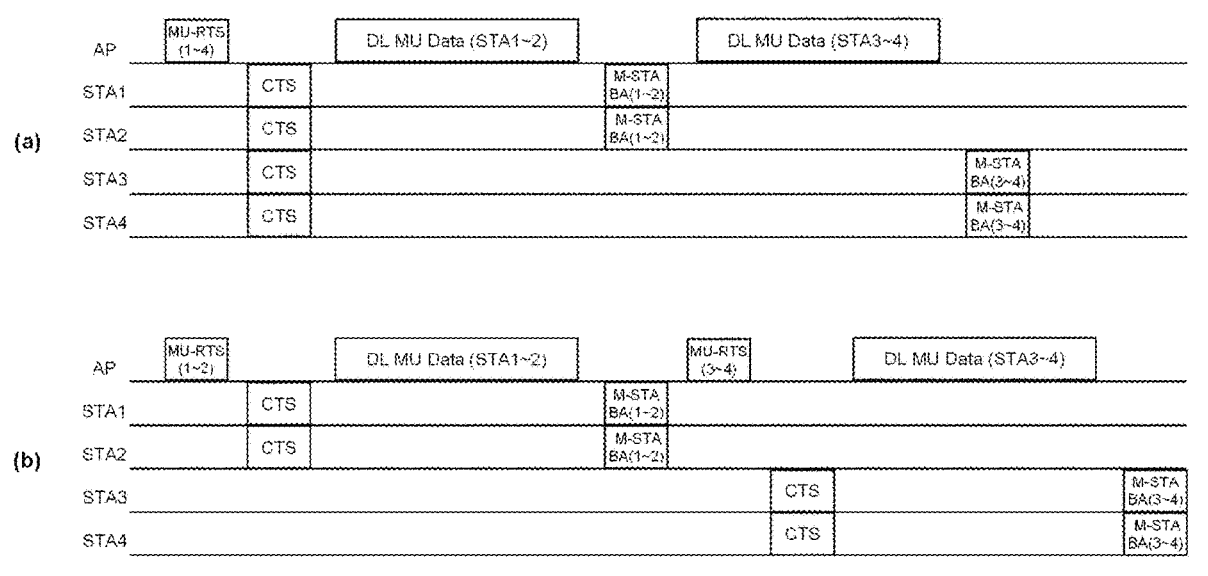

FIG. 21 illustrates a further embodiment of a downlink multi-user transmission process. According to the embodiment of the present invention, DL-MU transmission can be performed a plurality of times within the same TXOP. In the embodiment of FIG. 21, an AP transmits downlink multi-user data to STA1 and STA2 in the first DL-MU transmission process, and the AP transmits downlink multi-user data to STA3 and STA4 in the subsequent DL-MU transmission process. In the embodiment of FIG. 21, duplicative description of parts which are the same as or corresponding to the above-described embodiment of FIG. 18(a) will be omitted.

First, referring to the embodiment of FIG. 21(a), when a plurality of DL-MU transmissions are performed in the same TXOP, transmission and reception of MU-RTS and CTS for the target STAs in the entire DL-MU transmission process may be performed at once in the initial stage. That is, the AP transmits an MU-RTS by designating STA1 and STA2 in the first DL-MU transmission process and STA3 and STA4 in the second DL-MU transmission process as receivers. According to an embodiment, the duration field of the MU-RTS is set to a period up to the end of the entire DL-MU transmission process, that is, the end of the first DL-MU transmission process and the second DL-MU transmission process. Receivers receiving the MU-RTS from the AP, that is, STA1, STA2, STA3 and STA4 simultaneously transmit a CTS.

The AP receives the CTS from the STAs and performs a DL-MU transmission. First, in the first DL-MU transmission process, the AP transmits DL-MU data to STA1 and STA2, respectively. STA1 and STA2 receive the DL-MU data transmitted by the AP, and transmit an M-STA BA in response thereto. Next, the AP performs the second DL-MU transmission process without a separate backoff procedure. In the second DL-MU transmission process, the AP transmits DL-MU data to STA3 and STA4, respectively. STA3 and STA4 receive the DL-MU data transmitted by the AP, and transmit an M-STA BA in response thereto. According to the embodiment of FIG. 21(a), when a plurality of DL-MU transmissions are performed in the same TXOP, the time for exchange of MU-RTS and CTS can be shortened. However, neighboring terminals of STA3 and STA4 may set a NAV even in the first DL-MU transmission process for STA1 and STA2, which may unnecessarily restrict channel access. Likewise, neighboring terminals of STA1 and STA2 may set a NAV even in the second DL-MU transmission process for STA3 and STA4, which may unnecessarily restrict channel access.

Next, Referring to the embodiment of FIG. 21(b), when a plurality of DL-MU transmissions are performed in the same TXOP, the transmission and reception of MU-RTS and CTS for the target STAs of the corresponding DL-MU transmission process may be performed at the beginning of each DL-MU transmission process. That is, the AP transmits the first MU-RTS by designating STA1 and STA2 as receivers before DL-MU data transmission in the first DL-MU transmission process. According to an embodiment, a duration field of the first MU-RTS is set to a period up to the end of the first DL-MU transmission process. Receivers receiving the first MU-RTS from the AP, that is, STA1 and STA2 set a duration field of the CTS based on the duration field of the first MU-RTS, and then transmit the CTS simultaneously. The AP receives the CTS from the STAs and transmits DL-MU data to STA1 and STA2. STA1 and STA2 receive the DL-MU data transmitted by the AP, and transmit an M-STA BA in response thereto.

The AP receiving the M-STA BA in the first DL-MU transmission process transmits an MU-RTS for the second DL-MU transmission process without a separate backoff procedure. That is, the AP transmits the second MU-RTS by designating STA3 and STA4 as receivers before DL-MU data transmission in the second DL-MU transmission process. According to an embodiment, a duration field of the second MU-RTS is set to a period up to the end of the second DL-MU transmission process. Receivers receiving the second MU-RTS from the AP, that is, STA3 and STA4 set a duration field of the CTS based on the duration field of the second MU-RTS, and then transmit the CTS simultaneously. The AP receives the CTS from the STAs and transmits DL-MU data to STA3 and STA4. STA3 and STA4 receive the DL-MU data transmitted by the AP, and transmit an M-STA BA in response thereto. According to the embodiment of FIG. 21(b), the neighboring terminals of STA3 and STA4 do not set a NAV in the first DL-MU transmission process for STA1 and STA2, thereby unnecessary NAV setting of neighboring terminals can be reduced. Likewise, the neighboring terminals of STA1 and STA2 do not set a NAV in the second DL-MU transmission process for STA3 and STA4, thereby unnecessary NAV setting can be reduced.

Figure 22:
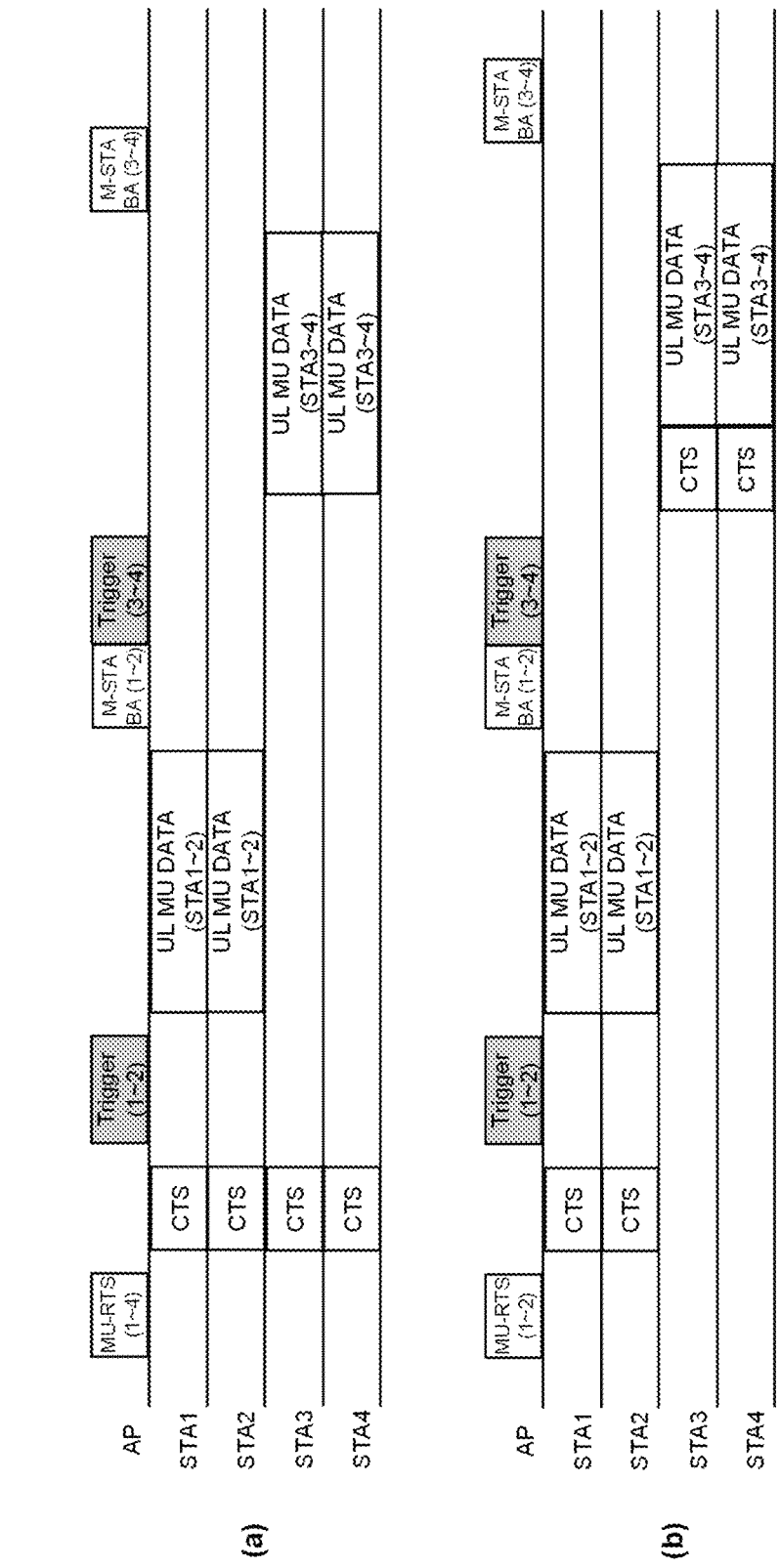
FIG. 22 illustrates a further embodiment of an uplink multi-user transmission process.

FIG. 22 illustrates a further embodiment of an uplink multi-user transmission process. According to the embodiment of the present invention, a plurality of UL-MU transmissions may be performed within the same TXOP. In the embodiment of FIG. 22, STA1 and STA2 transmit uplink multi-user data to an AP in the first UL-MU transmission process, and STA3 and STA4 transmit uplink multi-user data to the AP in the subsequent second UL-MU transmission process. In the embodiment of FIG. 22, duplicative description of parts which are the same as or corresponding to the embodiments of FIGS. 18(b) and 18(c) described above will be omitted.

First, referring to the embodiment of FIG. 22(a), when a plurality of UL-MU transmissions are performed in the same TXOP, transmission and reception of MU-RTS and CTS for target STAs in the entire UL-MU transmission process may be performed at once in the initial stage. That is, the AP transmits an MU-RTS by designating STA1 and STA2 in the first UL-MU transmission process and STA3 and STA4 in the second UL-MU transmission process at all as receivers. According to an embodiment, the duration field of the MU-RTS is set to a period up to the end of the entire UL-MU transmission process, that is, the end of the first UL-MU transmission process and the second UL-MU transmission process. Receivers receiving the MU-RTS from the AP, that is, STA1, STA2, STA3 and STA4 simultaneously transmit a CTS.

The AP receives the CTS from the STAs and transmits a trigger frame for a UL-MU transmission. First, in the first UL-MU transmission process, the AP indicates STA1 and STA2 to transmit UL-MU data by transmitting a trigger frame. STA1 and STA2 receive the trigger frame transmitted by the AP and transmit UL-MU data in response thereto. The AP receiving the UL-MU data from the STAs transmits an M-STA BA in response thereto. Next, the AP transmits a trigger frame for the second UL-MU transmission process without a separate backoff procedure. In the second UL-MU transmission process, the AP indicates STA3 and STA4 to transmit UL-MU data by transmitting a trigger frame. STA3 and STA4 receive the trigger frame transmitted by the AP, and transmit UL-MU data in response thereto. The AP receiving the UL-MU data from the STAs transmits an M-STA BA in response thereto.

Meanwhile, according to the embodiment of the present invention, when an additional UL-MU transmission process is performed within the remaining TXOP time of the same TXOP, an M-STA BA of the previous UL-MU transmission process and a trigger frame of the next UL-MU transmission process may be aggregated and transmitted in a single A-MPDU. That is, the M-STA BA of the first UL-MU transmission process and the trigger frame of the second UL-MU transmission process may be aggregated and transmitted in a single A-MPDU.

Next, referring to the embodiment of FIG. 22(b), when a plurality of UL-MU transmissions are performed in the same TXOP, transmission and reception of MU-RTS and CTS for the STAs in the corresponding UL-MU transmission process may be performed at the beginning of each UL-MU transmission process. That is, the AP transmits the first MU-RTS by designating STA1 and STA2 as receivers before transmitting a trigger frame for the first UL-MU transmission process. When the first UL-MU transmission process is completed, the AP transmits a trigger frame for the second UL-MU transmission process without a separate backoff procedure. As described above, according to the embodiment of the present invention, the M-STA BA of the first UL-MU transmission process and the trigger frame of the second UL-MU transmission process may be aggregated and transmitted in a single A-MPDU.

Figure 23:
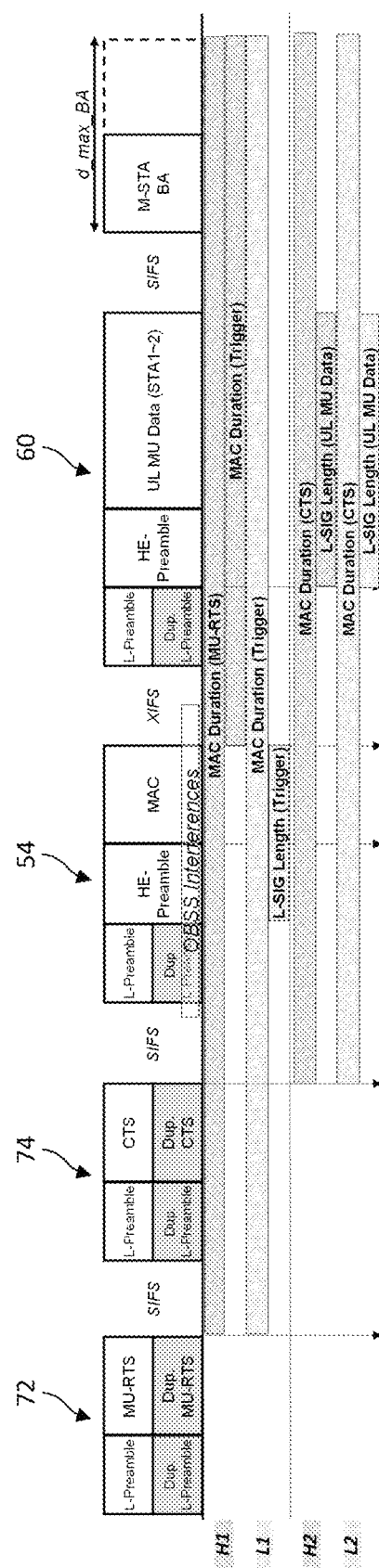
FIG. 23 illustrates an uplink multi-user transmission process according to a further embodiment of the present invention and operations of hidden nodes according to the process.

FIG. 23 illustrates an uplink multi-user transmission process according to a further embodiment of the present invention and operations of hidden nodes according to the process. In the embodiment of FIG. 23, the trigger frame 54 according to the embodiment of FIG. 16 described above is used, and an MU-RTS 72 and a CTS 74 may be additionally used in the UL-MU transmission process. In the embodiment of FIG. 23, duplicative description of parts which are the same as or corresponding to the above-described embodiment of FIG. 16 will be omitted.

According to the embodiment of the present invention, when at least one of the following predetermined conditions is satisfied in the UL-MU transmission process, the MU-RTS 72 and the CTS 74 may be transmitted in advance. 1) the HE PPDU trigger frame 54 is used for the UL-MU transmission process, 2) the length of UL-MU data is a predetermined length or more, 3) the number of STAs participating in the UL-MU transmission process is a predetermined number or more, 4) the length of an M-STA BA in the UL-MU transmission process is expected to increase beyond a certain length, 5) there is a restriction of the format or MCS of the PPDU to be used for the M-STA BA in the UL-MU transmission process, 6) the UL-MU data is transmitted through a wideband channel or using an OFDMA, and 7) at least one outdoor STA is present among STAs participating in the UL-MU transmission.

Meanwhile, although the conditions for use of the MU-RTS 72 and the CTS 74 in the UL-MU transmission process are described above, the MU-RTS 72 and the CTS 74 may be additionally used in the DL-MU transmission process as well in a similar manner.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A base wireless communication terminal comprising:
a transceiver configured to transmit and receive wireless signals; and
a processor configured to process wireless signals transmitted or received through the transceiver,
wherein the processor is configured to:
transmit a first trigger frame soliciting a first uplink multi-user (UL-MU) transmission process,
receive an uplink physical layer protocol data unit (PPDU) from one or more terminals in response to the first trigger frame, and
transmit an aggregate medium access control (MAC) protocol data unit (A-MPDU), wherein an acknowledgment frame for the received uplink PPDU and a second trigger frame soliciting a second UL-MU transmission process are aggregated and included in the A-MPDU, wherein the first trigger frame includes duration information related to time at which the uplink PPDU and the acknowledgment frame are transmitted, wherein the acknowledgment frame is located before the second trigger frame in the A-MPDU, wherein a non-legacy preamble of at least one of the first trigger frame, the second trigger frame, and the uplink PPDU contains remaining transmission opportunity (TXOP) time information of a current TXOP, wherein a number of bits of a TXOP duration field equals to or is fewer than a number of bits of a duration field indicating the remaining TXOP time information in a MAC header of a corresponding PPDU, and wherein the remaining TXOP time information is represented by the TXOP duration field of a high efficiency signal field A (HE-SIG-A) of the non-legacy preamble.

2. The base wireless communication terminal of claim 1, wherein the second UL-MU transmission process is a process for transmitting an additional PPDU different from the first UL MU transmission process for transmission of the uplink PPDU.

3. The base wireless communication terminal of claim 1, wherein the first UL-MU transmission process is determined to be successful when the uplink PPDU is received from at least one of the one or more terminals.

4. The base wireless communication terminal of claim 1, wherein the second trigger frame is aggregated with the acknowledgment frame when the second UL-MU transmission process can be performed within a current TXOP.

5. The base wireless communication terminal of claim 1, wherein the acknowledgement frame precedes the second trigger frame in the A-MPDU.

6. The base wireless communication terminal of claim 1, wherein the acknowledgement frame includes a multi-STA block ACK having a variable length within a maximum length of a block ACK.

7. A wireless communication method of a base wireless communication terminal comprising:

transmitting a first trigger frame soliciting a first uplink multi-user (UL-MU) transmission process;

receiving an uplink physical layer protocol data unit (PPDU) from one or more terminals in response to the first trigger frame; and transmitting an aggregate medium access control (MAC) protocol data unit (A-MPDU), wherein an acknowledgment frame for the received uplink PPDU and a second trigger frame soliciting a second UL-MU transmission process are aggregated and included in the A-MPDU, wherein the first trigger frame includes duration information related to time at which the uplink PPDU and the acknowledgment frame are transmitted, wherein the acknowledgment frame is located before the second trigger frame in the A-MPDU, wherein a non-legacy preamble of at least one of the first trigger frame, the second trigger frame, and the uplink PPDU contains remaining transmission opportunity (TXOP) time information of a current TXOP, wherein a number of bits of a TXOP duration field equals to or is fewer than a number of bits of a duration field indicating the remaining TXOP time information in a MAC header of a corresponding PPDU, and wherein the remaining TXOP time information is represented by the TXOP duration field of a high efficiency signal field A (HE-SIG-A) of the non-legacy preamble.

8. The wireless communication method of claim 7, wherein the second UL-MU transmission process is a process for transmitting an additional PPDU different from the first UL MU transmission process for transmission of the uplink PPDU.

9. The wireless communication method of claim 7, wherein the first UL-MU transmission process is determined to be successful when the uplink PPDU is received from at least one of the one or more terminals.

10. The wireless communication method of claim 7, wherein the second trigger frame is aggregated with the acknowledgment frame when the second UL-MU transmission process can be performed within a current TXOP.

11. The wireless communication method of claim 7, wherein the acknowledgement frame precedes the second trigger frame in the A-MPDU.

12. The wireless communication method of claim 7, wherein the acknowledgement frame includes a multi-STA block ACK having a variable length within a maximum length of a block ACK.

* * * * *